(12) United States Patent
Brewer

(10) Patent No.: US 10,616,089 B2
(45) Date of Patent: *Apr. 7, 2020

(54) DETERMINING EXPLICIT AND IMPLICIT USER BIASES FOR SEARCH RESULTS ON ONLINE SOCIAL NETWORKS

(71) Applicant: Facebook, Inc., Menlo Park, CA (US)

(72) Inventor: Jason Eric Brewer, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 15/837,864

(22) Filed: Dec. 11, 2017

(65) Prior Publication Data

US 2018/0115479 A1 Apr. 26, 2018

Related U.S. Application Data

(63) Continuation of application No. 14/449,489, filed on Aug. 1, 2014, now Pat. No. 9,871,714.

(51) Int. Cl.
*G06F 7/00* (2006.01)
*H04L 12/26* (2006.01)
*G06F 16/901* (2019.01)
*G06Q 50/00* (2012.01)

(52) U.S. Cl.
CPC .......... *H04L 43/12* (2013.01); *G06F 16/9024* (2019.01); *G06Q 50/01* (2013.01)

(58) Field of Classification Search
CPC ...... H04L 43/12; G06F 16/9024; G06Q 50/01
USPC ....................................................... 707/734
See application file for complete search history.

(56) References Cited

U.S. PATENT DOCUMENTS

| | | | |
|---|---|---|---|
| 6,539,232 B2 | 3/2003 | Hendrey |
| 6,957,184 B2 | 10/2005 | Schmid |
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Van Den Oord |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |

(Continued)

*Primary Examiner* — Pavan Mamillapalli
(74) *Attorney, Agent, or Firm* — Baker Botts L.L.P.

(57) ABSTRACT

In one embodiment, a method includes receiving a query input, parsing the query input to identify one or more n-grams, determining a search bias of the first user with respect to the query input, the search bias being determined based on an explicit bias and an implicit bias of the first user, wherein the explicit bias is based on an analysis of the entities associated with the online social networking matching n-grams in the query input, and wherein the implicit bias is based on an analysis of user-profile information of a plurality of second users sharing one or more user attributes with the first user, identifying content objects matching the query input based at least in part on the search bias of the first user, and sending instructions for presenting a search-results interface comprising references to the identified content objects.

27 Claims, 19 Drawing Sheets

(56) References Cited

U.S. PATENT DOCUMENTS

| | | | |
|---|---|---|---|
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,521,591 B1 | 8/2013 | Lawrence | |
| 8,538,960 B2 | 9/2013 | Wong | |
| 8,572,129 B1 | 10/2013 | Lee | |
| 8,595,297 B2 | 11/2013 | Marcucci | |
| 8,601,027 B2 | 12/2013 | Behforooz | |
| 8,732,208 B2 | 5/2014 | Lee | |
| 8,751,521 B2 | 6/2014 | Lee | |
| 8,782,080 B2 | 7/2014 | Lee | |
| 8,812,509 B1* | 8/2014 | Pasca | G06F 16/951 707/741 |
| 8,938,463 B1 | 1/2015 | Kim | |
| 9,143,414 B2 | 9/2015 | Parkar | |
| 9,177,029 B1* | 11/2015 | Chau | G06F 16/9535 |
| 9,262,058 B2* | 2/2016 | Mubarek | G06Q 50/01 |
| 2002/0196273 A1 | 12/2002 | Krause | |
| 2003/0154194 A1 | 8/2003 | Jonas | |
| 2003/0187831 A1* | 10/2003 | Bestgen | G06F 16/24542 707/999.003 |
| 2003/0208474 A1 | 11/2003 | Soulanille | |
| 2004/0088325 A1 | 5/2004 | Elder | |
| 2004/0255237 A1 | 12/2004 | Tong | |
| 2005/0131872 A1 | 6/2005 | Calbucci | |
| 2005/0171955 A1 | 8/2005 | Hull | |
| 2006/0136419 A1 | 6/2006 | Brydon | |
| 2007/0226248 A1* | 9/2007 | Darr | G06Q 10/10 707/999.102 |
| 2007/0277100 A1 | 11/2007 | Sheha | |
| 2008/0072180 A1 | 3/2008 | Chevalier | |
| 2008/0183695 A1 | 7/2008 | Jadhav | |
| 2008/0270615 A1 | 10/2008 | Centola | |
| 2009/0006543 A1 | 1/2009 | Smit | |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0281988 A1 | 11/2009 | Yoo | |
| 2009/0299963 A1 | 12/2009 | Pippori | |
| 2010/0049802 A1 | 2/2010 | Raman | |
| 2010/0228744 A1 | 9/2010 | Craswell | |
| 2010/0235354 A1 | 9/2010 | Gargaro | |
| 2010/0306119 A1* | 12/2010 | Banerjee | G06Q 10/00 705/319 |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1 | 6/2011 | Wable | |
| 2011/0191371 A1 | 8/2011 | Elliott | |
| 2011/0196855 A1 | 8/2011 | Wable | |
| 2011/0276396 A1 | 11/2011 | Rathod | |
| 2011/0313992 A1 | 12/2011 | Groeneveld | |
| 2012/0136852 A1 | 5/2012 | Geller | |
| 2012/0143789 A1 | 6/2012 | Wang | |
| 2012/0166432 A1 | 6/2012 | Tseng | |
| 2012/0179637 A1 | 7/2012 | Juan | |
| 2012/0185486 A1 | 7/2012 | Voigt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | Van Den Oord | |
| 2012/0311034 A1 | 12/2012 | Goldband | |
| 2013/0031106 A1 | 1/2013 | Schechter | |
| 2013/0041876 A1 | 2/2013 | Dow | |
| 2013/0066876 A1 | 3/2013 | Raskino | |
| 2013/0086057 A1 | 4/2013 | Harrington | |
| 2013/0124538 A1 | 5/2013 | Lee | |
| 2013/0124542 A1 | 5/2013 | Lee | |
| 2013/0144899 A1 | 6/2013 | Lee | |
| 2013/0191372 A1 | 7/2013 | Lee | |
| 2013/0191416 A1 | 7/2013 | Lee | |
| 2014/0006389 A1* | 1/2014 | Garcia | G06Q 30/0201 707/723 |
| 2014/0172914 A1* | 6/2014 | Elnikety | G06F 16/9024 707/774 |
| 2016/0034462 A1 | 2/2016 | Brewer | |
| 2016/0034463 A1 | 2/2016 | Brewer | |

* cited by examiner

740

741 — identifying at least one biased node that is connected to at least one of the plurality of user nodes corresponding to the plurality of second users by one or more edges 742 — including the at least one biased node in the plurality of second nodes when the at least one biased node satisfies the structured query

*FIG. 7C*

DETERMINING EXPLICIT AND IMPLICIT USER BIASES FOR SEARCH RESULTS ON ONLINE SOCIAL NETWORKS

PRIORITY

This application is a continuation under 35 U.S.C. § 120 of U.S. patent application Ser. No. 14/449,489, filed 1 Aug. 2014, which is incorporated herein by reference.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include user information such as demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user of a social-networking system may search for objects associated with the system using queries that include references to particular social-graph elements. Structured queries may provide a powerful way for users of an online social network to search for objects represented in a social graph based on their social-graph attributes and their relation to various social-graph elements.

In particular embodiments, the social-networking system may rank search results based on an inferred search bias of the querying user (i.e., a user bias). To improve the relevancy of search results to a querying user, social-networking system 160 may use user information associated with the querying user to bias search results towards results that are related to the querying user. In particular embodiments, the querying user's bias may be determined in a variety of ways, such as, for example, based on social-graph information, which may include like/check-in activity, user profile information, other suitable information related to one or more users, or any combination thereof. These biases may be pre-determined by the social-networking system, may be calculated in response to particular queries, may be determined at other appropriate times, or any combination thereof. In particular embodiments, the social-networking system may rank search results that match the bias higher than other results. As an example, and not by way of limitation, the social-networking system may determine that a particular user has a bias for traditional Chinese restaurants based on profile information indicating the user has lived in China, the types of check-ins the user has done, and so on. As an example, and not by way of limitation, when the user searches for Chinese restaurants, the social-networking system may bias or boost the results to rank traditional Chinese restaurants over non-traditional Chinese restaurants based on the user's bias.

In particular embodiments, the querying user's user bias may be determined based on preferences and/or activities of other users who are similar to the querying user. Similar users are identified by shared attributes that represent information they have in common with the querying user. These users may be used to identify search results to be boosted in ranking. For example, search results whose social graph nodes are connected by edges to users in the sub-population may be boosted or otherwise biased.

In particular embodiments, if a sub-population such as a group of social network users is specified in the query received from the user, then results of the query that are liked by or otherwise connected to users in the group at a greater proportion than are other users may be ranked higher than results connected to other users. This "explicit" bias may be based on information explicitly specified in the search query. The explicit techniques based on the query, and implicit techniques based on user information, may be used separately or in combination. The biasing or boosting of search results may be accomplished by using a probabilistic TF-IDF ranking algorithm. Each search result may be assigned a feature value or weight based upon a comparison of the percentage of users in a sub-population who are connected to (e.g., like) each search result with the percentage of users in the overall social-network population who are connected with the search result. For example, the social-networking system may access the forward index of each search result and determine what percentage of the users in the sub-population checked-in (or are otherwise connected to) the entity associated with each search result compared to the percentage of the overall population of users who checked-in at (or are otherwise connected to) the entity associated with the search result. The ratio of the two percentages may be used as a feature value to rank the search results in a machine-learning model.

BRIEF DESCRIPTION OF THE DRAWINGS

FIG. 7C illustrates, in a flowchart, a method for identifying search results in a social graph.

DESCRIPTION OF EXAMPLE EMBODIMENTS

System Overview

Figure 1:
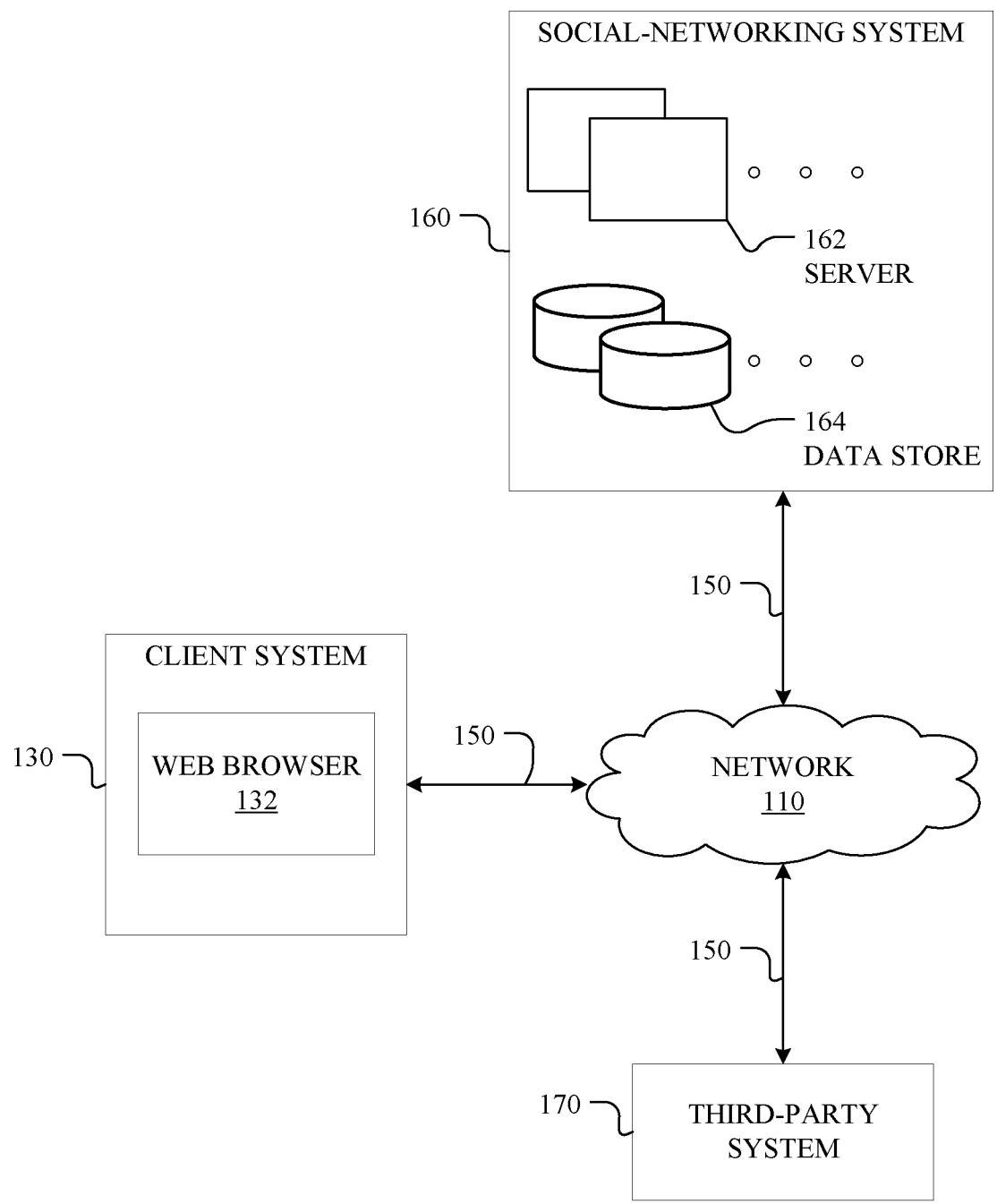
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
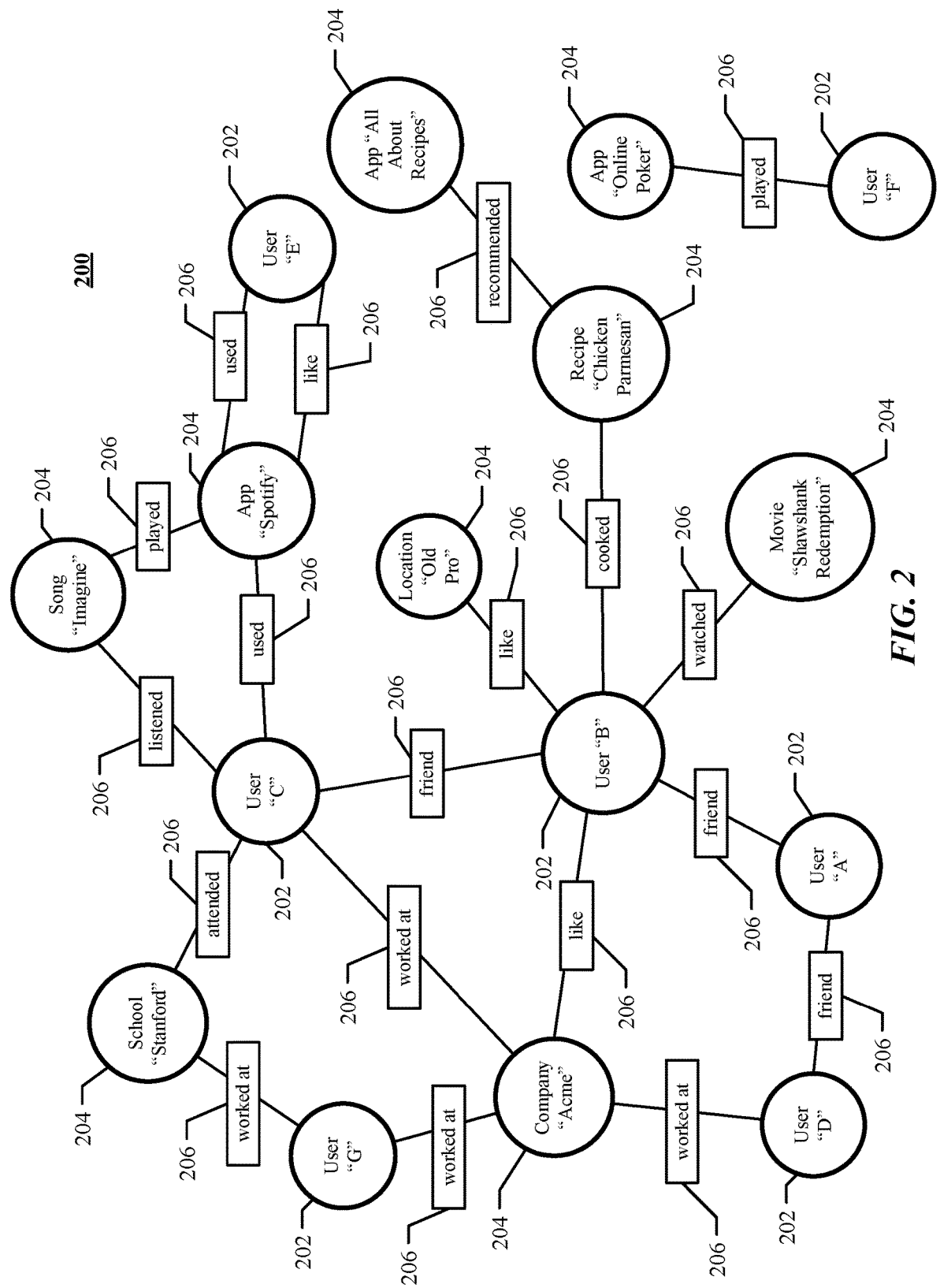
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other user information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Information on indexes and search queries may be found in U.S. patent application Ser. No. 13/560,212, filed 27 Jul. 2012, U.S. patent application Ser. No. 13/560,901, filed 27 July 2012, and U.S. patent application Ser. No. 13/723,861, filed 21 Dec. 2012, each of which is incorporated by reference.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Figure 3:
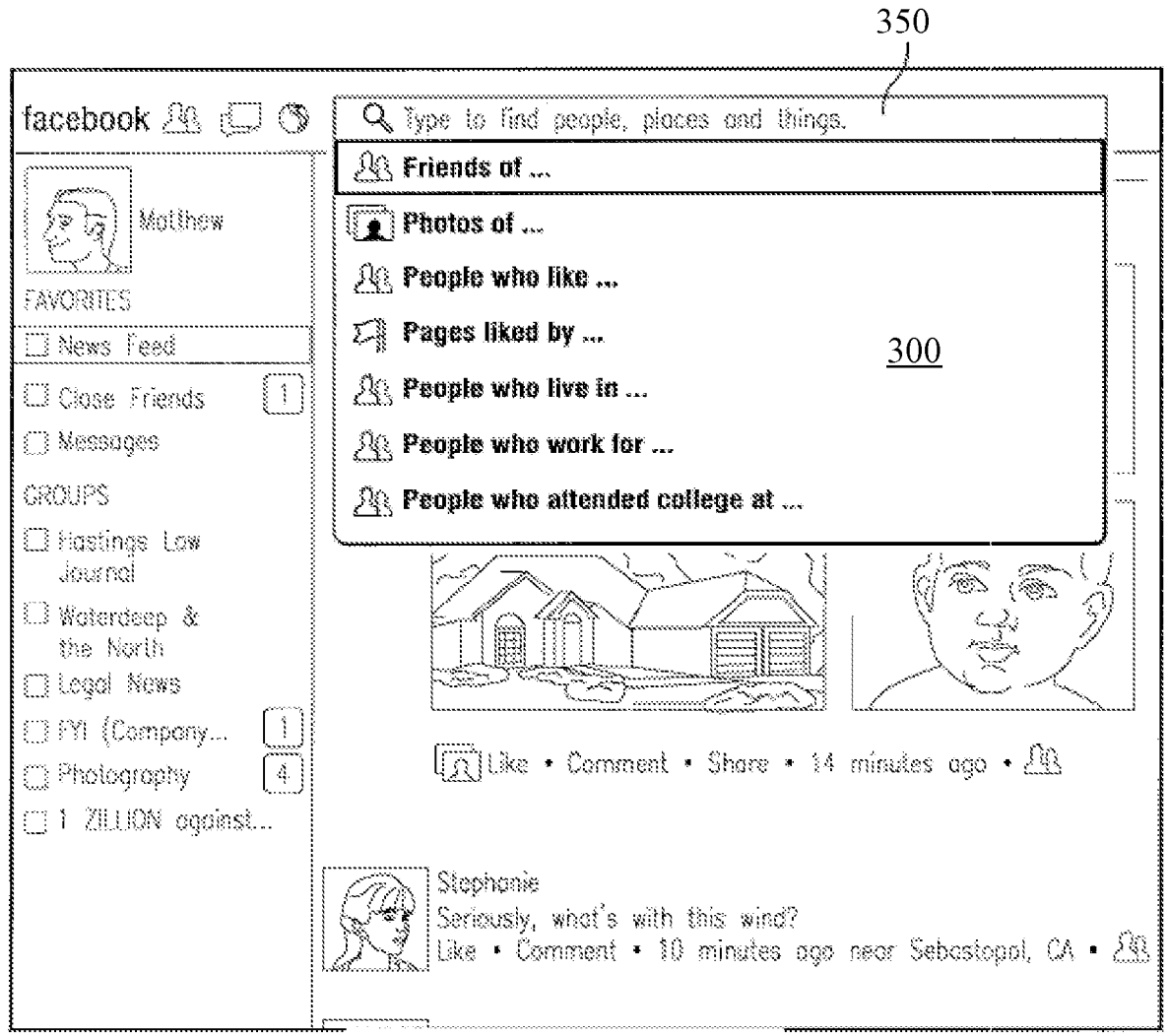
FIG. 3 illustrates queries submitted via an example webpage of an online social network.

FIG. 3 illustrates queries submitted via an example webpage of an online social network. In particular embodiments, a user may submit a query to the social-network system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on social-networking system 160 that matches the text query. Social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. Social-networking system 160 may then generate a search-results webpage with search results corresponding to the identified content and send the search-results webpage to the user. In particular embodiments, the search engine may limit its search to resources and content on the online social network. However, in particular embodiments, the search engine may also search for resources or contents on other sources, such as third-party system 170, the internet or World Wide Web, or other suitable sources. Although this disclosure describes querying social-networking system 160 in a particular manner, this disclosure contemplates querying social-networking system 160 in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into the query filed 350 as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays references to the matching profile pages (e.g., a name or photo associated with the page) of the respective user nodes 202 or concept nodes 204, and displays names of matching edges 206 that may connect to the matching user nodes 202 or concept nodes 204, which the user can then click on or otherwise select, thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and/or edges, the typeahead process may send a request that informs social-networking system 160 of the user's confirmation of a query containing the matching social-graph elements. In response to the sent request, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, each of which is incorporated by reference.

Figure 4:
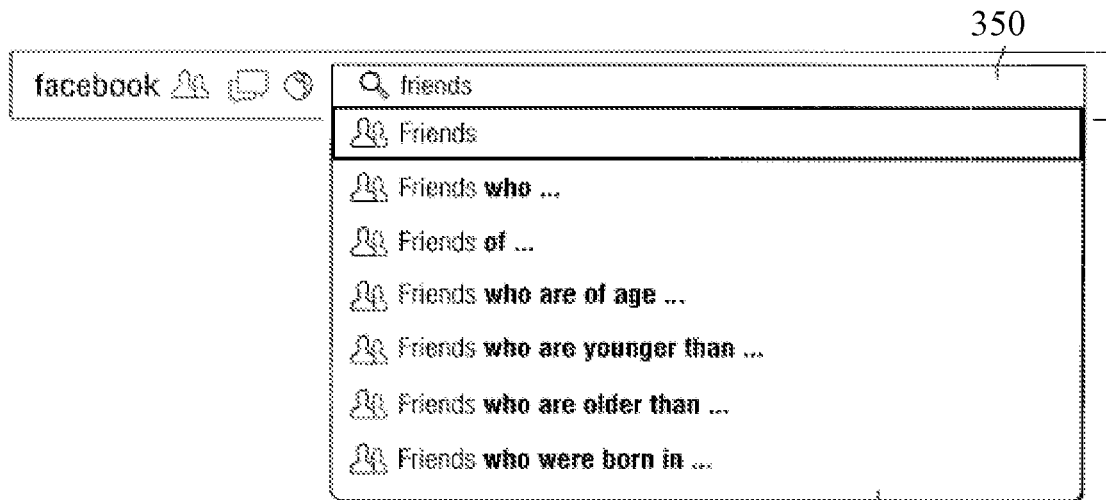
FIG. 4 illustrates example queries of an online social network.

FIG. 4 illustrates example queries of the online social network. In particular embodiments, in response to a text query received from a first user (i.e., the querying user), social-networking system 160 may parse the text query and identify portions of the text query that correspond to particular social-graph elements. Social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate that the selected structured query should be run by social-networking system 160. FIG. 4 illustrates various example text queries in query field 350 and various structured queries generated in response in drop-down menus 300 (although other suitable graphical user interfaces are possible). By providing suggested structured queries in response to a user's text query, social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIG. 4 illustrates generating particular structured queries in a particular manner, this disclosure contemplates generating any suitable structured queries in any suitable manner.

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIG. 4. As the querying user enters this text query into query field 350, social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me)", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, social-networking system 160 may parse the text query "friends stanford" to identify the following n-grams: friends; stanford; friends stanford. As another example and not by way of limitation, social-networking system 160 may parse the text query "friends in palo alto" to identify the following n-grams: friends; in; palo; alto; friends in; in palo; palo alto; friend in palo; in palo alto; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

Generating Structured Search Queries

In particular embodiments, social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. Although this disclosure describes accessing particular grammars, this disclosure contemplates any suitable grammars.

In particular embodiments, social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $\langle E, N, S, P \rangle$, where the disjoint sets $\Sigma$ and $N$ specify the terminal and non-terminal symbols, respectively, with $S \in N$ being the start symbol. P is the set of productions, which take the form $E \rightarrow \xi(p)$, with $E \in N$, $\xi \in (\Sigma \cup N)^+$, and $p = Pr(E \rightarrow \xi)$, the probability that E will be expanded into the string $\xi$. The sum of probabilities p over all expansions of a given non-terminal E must be one. Although this disclosure describes generating strings in a particular manner, this disclosure contemplates generating strings in any suitable manner.

In particular embodiments, social-networking system 160 may generate one or more structured queries. The structured queries may be based on the natural-language strings generated by one or more grammars, as described previously. Each structured query may include references to one or more of the identified nodes or one or more of the identified edges 206. This type of structured query may allow social-networking system 160 to more efficiently search for resources and content related to the online social network (such as, for example, profile pages) by searching for content connected to or otherwise related to the identified user nodes 202 and the identified edges 206. As an example and not by way of limitation, in response to the text query, "show me friends of my girlfriend," social-networking system 160 may generate a structured query "Friends of Stephanie," where "Friends" and "Stephanie" in the structured query are references corresponding to particular social-graph elements. The reference to "Stephanie" would correspond to a particular user node 202 (where social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, social-networking system 160 may identify one or more user nodes 202 connected by friend-type edges 206 to the user node 202 corresponding to "Stephanie". As another example and not by way of limitation, in response to the text query, "friends who like facebook," social-networking system 160 may generate a structured query "Friends who like Facebook," where "Friends," "like," and "Facebook" in the structured query are references corresponding to particular social-graph elements as described previously (i.e., a friend-type edge 206, a like-type edge 206, and concept node 204 corresponding to the company "Facebook"). Although this disclosure describes generating particular structured queries in a particular manner, this disclosure contemplates generating any suitable structured queries in any suitable manner.

In particular embodiments, social-networking system 160 may rank the generated structured queries. The structured queries may be ranked based on a variety of factors, such as, for example, in order of the probability or likelihood that the identified nodes/edges referenced in those structured queries match the search bias of the querying user, as determined by social-networking system 160. After ranking the structured queries, social-networking system 160 may then send only those structured queries having a rank greater than a threshold rank (e.g., the top seven ranked queries may be sent to the querying user and displayed in a drop-down menu 300). In particular embodiments, the rank for a structured query may be based on the degree of separation between the user node 202 of the querying user and the particular social-graph elements referenced in the structured query. Structured queries that reference social-graph elements that are closer in the social graph 200 to the querying user (i.e., fewer degrees of separation between the element and the querying user's user node 202) may be ranked more highly than structured queries that reference social-graph elements that are further from the user (i.e., more degrees of separation). In particular embodiments, social-networking system 160 may rank the structured queries based on a search history associated with the querying user. Structured queries that reference social-graph elements that the querying user has previously accessed, or are relevant to the social-graph elements the querying user has previously accessed, may be more likely to be the target of the querying user's search query. Thus, these structured queries may be ranked more highly. As an example and not by way of limitation, if querying user has previously visited the "Stanford University" profile page but has never visited the "Stanford, Calif." profile page, when determining the rank for structured queries referencing these concepts, social-networking system 160 may determine that the structured query referencing the concept node 204 for "Stanford University" has a relatively high rank because the querying user has previously accessed the concept node 204 for the school. In particular embodiments, a structured query may include a snippet of contextual information about one or more of the social-graph elements referenced in the structured query. In particular embodiments, social-networking system 160 may rank the structured queries based on advertising sponsorship. An advertiser (such as, for example, the user or administrator of a particular profile page corresponding to a particular node) may sponsor a particular node such that a structured query referencing that node may be ranked more highly. Although this disclosure describes ranking structured queries in a particular manner, this disclosure contemplates ranking structured queries in any suitable manner.

In particular embodiments, social-networking system 160 may receive from the querying user a selection of one of the structured queries. The nodes and edges referenced in the received structured query may be referred to as the selected nodes and selected edges, respectively. As an example and not by way of limitation, the web browser 132 on the querying user's client system 130 may display the sent structured queries in a drop-down menu 300, as illustrated in FIG. 4, which the user may then click on or otherwise select (e.g., by simply keying "enter" on his keyboard) to indicate the particular structured query the user wants social-networking system 160 to execute. Upon selecting a particular structured query, the user's client system 130 may call or otherwise instruct to social-networking system 160 to execute the selected structured query. Although this disclosure describes receiving selections of particular structured queries in a particular manner, this disclosure contemplates receiving selections of any suitable structured queries in any suitable manner.

More information on generating structured queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Parsing Search Queries and Generating Query Commands

In particular embodiments, social-networking system 160 may generate a query command based on a structured query received from a querying user. The query command may then be used in a search against objects in a data store 164 of the social-networking system 160. In particular embodiments, the query command may be provided for a search using search indices for one or more data stores or verticals of social-networking system 160. The query command may comprise one or more query constraints. Each query constraint may be identified by social-networking system 160 based on a parsing of the structured query. Each query constraint may be a request for a particular object-type. In particular embodiments, the query command may comprise query constraints in symbolic expression or s-expression. Social-networking system 160 may parse the structured query "Photos I like" to a query command (photos_liked_by: <me>). The query command (photos_liked_by: <me>) denotes a query for photos liked by a user (i.e., <me>, which corresponding to the querying user), with a single result-type of photo. The query constraint may include, for example, social-graph constraints (e.g., requests for particular nodes or nodes-types, or requests for nodes connected to particular edges or edge-types), object constraints (e.g., request for particular objects or object-types), location constraints (e.g., requests for objects or social-graph entities associates with particular geographic locations), other suitable constraints, or any combination thereof. In particular embodiments, the parsing of the structured query may be based on the grammar used to generate the structured query. In other words, the generated query command and its query constraints may correspond to a particular grammar (or a sub-tree from a grammar forest). In particular embodiments, a query command may comprise prefix and an object. The object may correspond to a particular node in the social graph 200, while the prefix may correspond to a particular edge 206 or edge-type (indicating a particular type of relationship) connecting to the particular node in the social graph 200. As an example and not by way of limitation, the query command (pages_liked_by: <user>) comprises a prefix pages_liked_by, and an object <user>. In particular embodiments, social-networking system 160 may execute a query command by traversing the social graph 200 from the particular node along the particular connecting edges 206 (or edge-types) to nodes corresponding to objects specified by query command in order to identify one or more search results. As an example and not by way of limitation, the query command (pages_liked_by: <user>) may be executed by social-networking system 160 by traversing the social graph 200 from a user node 202 corresponding to <user> along like-type edges 206 to concept nodes 204 corresponding to pages liked by <user>. Although this disclosure describes generating particular query commands in a particular manner, this disclosure contemplates generating any suitable query commands in any suitable manner.

In particular embodiments, social-networking system 160 may generate a query command comprising an inner query constraint and an outer query constraint. The inner query constraint may comprise a request for one or more search results of a first object-type, and the outer query constraint may comprise a request for one or more search results of a second object type. Each query constraint may be for one or more nodes connected to one or more of the selected nodes referenced in the structured query by one or more of the selected edges referenced in the structured query. The query command with one or more query constraints may comprise nested queries in s-expression. As an example and not by way of limitation, social-networking system 160 may convert the structured query "Pages liked by my friends", to a nested query such as, for example, (pages_liked_by: (friends_of: <me>)). The nested search query (pages_liked_by: (friends_of: <me>)) comprises an inner query constraint (friends_of: <me>) nested in an outer query constraint (pages_liked_by: <user>). The inner query constraint (friends_of: <me>) denotes a query for first-degree friends of a user (i.e., <me>), with a single result-type of user. The outer query constraint (pages_liked_by: <user>) denotes a query for pages liked by a user, with a single result-type of page. As another example and not by way of limitation, social-networking system 160 may convert the structured query "Photos of people named Tom", to a nested query such as, for example, (photos_of: (name: tom)). The nested query (photos_of: (name: tom)) comprises an inner query constraint (name: tom) nested in an outer query constraint (photos_of: <user>). The inner query constraint denotes a query for users whose name matching "Tom", with a single result-type of user. The outer query constraint (photos_of: <user>) denotes a query for photos that a user is tagged in, with a single result-type of photo. As yet another example, social-networking system 160 may convert the structured query "People who wrote posted liked by Bill", to a nested query such as, for example, (extract author (term posts_liked_by: <Bill>)). The query command may request (with an extract operator) a search result of one or more authors for posts that are liked by the user "Bill". The nested query may include an inner query (term posts_liked_by: <Bill>) corresponding to a search term that requests search results in posts that are liked by the user <Bill>. That is, the outer constraint requests a first search result of a first object-type (user), while the inner constraint requests second search results of a second object-type (post). Although this disclosure describes parsing queries in a particular manner, this disclosure contemplates parsing queries in any suitable manner.

In particular embodiments, social-networking system 160 may identify one or more nodes matching one or more query constraints of the query command. Social-networking system 160 may search one or more data stores 164 to identify one or more objects stored in the data stores that satisfy one or more constraints of a query command. As an example and not by way of limitation, social-networking system 160 may submit the query constraint (photos_liked_by: <me>) (with photo result-type) to photo vertical P3. Social-networking system 160 may access index server 330 of photo vertical 164, causing index server 330 to return results for the query constraint (photos_liked_by: <me>). In particular embodiments, social-networking system 160 may, for each query constraint of a query command, access and retrieve search results from at least one of the data stores 164. The accessed data store 164 may be configured to store objects of the object type of specified by the particular query constraint. Social-networking system 160 may then aggregate search results of the respective query constraints. As an example and not by way of limitation, the nested query (photos_of: (name: tom)) comprises the inner query constraint (name: tom) with a single result-type of user, and the outer query constraint (photos_of: <user>) with a single result-type of photo. Social-networking system 160 may then rearrange the nested query and first submit the inner query constraint (name: tom) (with user result-type) to user vertical P1. Social-networking system 160 may access index server 330 of user vertical P1, causing index server 330 to return search results of users <17>, <31>, and <59> (each represented by an user identifier). That is, each user of <17>, <31>, and <59> may have a name matching "tom." Social-networking system 160 may then re-write the nested query to an OR combination of queries (photos_of: <17>), (photos_of: <31>), and (photos_of: <59>)), each with a result-type of photo. Social-networking system 160 may then submit the queries (photos_of: <17>), (photos_of: <31>), and (photos_of: <59>) to photo vertical P3. Social-networking system 160 may access index server 330 of photo vertical P3, causing index server 330 to return search results of photos for the queries (photos_of: <17>), (photos_of: <31>), and (photos_of: <59>). In particular embodiments, social-networking system 160 may aggregate the search results by performing an OR operation on the search results. As an example and not by way of limitation, search results for the search query (photos_of: <17>) may be <1001> and <1002> (each represented by a photo identifier). Search results for the search query (photos_of: <31>) may be <1001>, <1326>, <9090>, and <5200>. Search results for the search query (photos_of: <59>) may be <9090> and <7123>. Social-networking system 160 may perform an OR operation on the search results, yielding final search results of <1001>, <1002>, <1326>, <9090>, <5200>, and <7123>. Although this disclosure describes identifying particular search results in a particular manner, this disclosure contemplates identifying any suitable search results in any suitable manner.

In particular embodiments, when identifying matching nodes for a query constraint, social-networking system 160 may only identify up to a threshold number of matching nodes in a particular vertical 164. This threshold number of matching objects may then be retrieved as search results. The threshold number may be chosen to enhance search quality or to optimize the processing of search results. As an example and not by way of limitation, social-networking system 160 may only identify the top N matching objects in a photos vertical 164 in response to a query command requesting photo objects. The top N photo objects may be determined by a static ranking of the photo objects in a search index corresponding to the photo vertical. In particular embodiments, the top N identified results may be re-ranked based on the search query itself. As an example and not by way of limitation, if N is 1000, the top 1000 photo objects (as determined by a static ranking) may be identified. These 1000 photo objects may then be ranked based on one or more factors (e.g., match to the search query or other query constraints, social-graph affinity, search history, etc.), and the top 20 results may then be generated as search results for presentation to the querying user. In particular embodiments, the top results after one or more rounds of rankings may be sent to an aggregator 320 for a final round of ranking, where results may be reordered, redundant results may be dropped, or any other type of results-processing may occur before presentation to the querying user. Although this disclosure describes identifying particular numbers of search result, this disclosure contemplates identifying any suitable numbers of search results. Furthermore, although this disclosure describes ranking search results in a particular manner, this disclosure contemplates ranking search results in any suitable manner.

In particular embodiments, social-networking system 160 may generate a query command comprising a "weak and" operator (WAND). The WAND operator may allow one or more of its arguments (e.g., keywords or logical expressions comprising operators and keywords) within the query command to be absent a specified number of times or percentage of time. Social-networking system 160 may take into account social-graph elements referenced in the structured query when generating a query command with a WAND operator by adding implicit query constraints that reference those social-graph elements. This information from the social graph 200 may be used to diversify search results using the WAND operator. As an example and not by way of limitation, if a user enters the structured query "Coffee shops in Palo Alto", social-networking system 160 may generate a query command such as, for example:

(WAND category: <coffee shop>
    location: <Palo Alto>: optional-weight 0.3).

In this example, instead of requiring that search results always match both the (category: <coffee shop>) and (location: <Palo Alto>) portions of the query command, the Palo Alto portion of the query is optionalized with a weight of 0.3. In this case, this means that 30% of the search results must match the (location: <Palo Alto>) term (i.e., must be connected by an edge 206 to the concept node 204 corresponding to the location "Palo Alto"), and the remaining 70% of the search results may omit that term. Thus, if N is 100, then 30 coffee shop results must have a location of "Palo Alto", and 70 coffee shop results may come from anywhere (e.g. from the global top 100 coffee shops determined by a static ranking of coffee shops). In particular embodiments, the term (category: <coffee shop>) may also be assigned an optional weight, such that the search results need not even always match the social-graph element for "Coffee shop" and some results may be chosen by social-networking system 160 to be any object (e.g. place).

In particular embodiments, social-networking system 160 may generate a query command comprising a "strong or" operator (SOR). The SOR operator may require one or more of its arguments (e.g., keywords or logical expressions comprising operators and keywords) within the query command to be present a specified number of times or percentage of time. Social-networking system 160 may take into account social-graph elements referenced in the structured query when generating a query command with a WAND operator by adding implicit query constraints that reference those social-graph elements. This information from the social graph 200 may be used to diversify search results using the SOR operator. As an example and not by way of limitation, if a user enters the structured query "Coffee shops in Palo Alto or Redwood City", social-networking system 160 may translate a query command such as, for example:

(AND category: <coffee shop>
  (SOR location: <Palo Alto>: optional-weight 0.4
    location: <Redwood City>: optional-weight 0.3)).

In this example, instead of allowing search results that match either the (location: <Palo Alto>) or (location: <Redwood City>) portions of the query command, the Palo Alto portion of the query is optionalized with a weight of 0.4 and the Redwood City portion of the query is optionalized with a weight of 0.3. In this case, this means that 40% of the search results must match the (location: <Palo Alto>) term (i.e., are concept nodes 204 corresponding to "coffee shops" that are each connected by an edge 206 to the concept node 204 corresponding to the (location <Palo Alto>), and 30% of the search results must match the (location: <Redwood City>) term, with the remainder of the search result matching either the Palo Alto or Redwood City constraints (or both, if appropriate in certain cases). Thus, if N is 100, then 40 coffee shop results must have a location of "Palo Alto", 30 coffee shop results must have a location of "Redwood City", and 30 coffee shops may come from either location.

In particular embodiments, in response to a query command comprising an inner and outer query constraint, social-networking system 160 may identify a first set of nodes matching an inner query constraint and at least in part matching an outer query constraint. In this way, the process of searching verticals 164 of objects associated with social-networking system 160 may be improved by generating query commands that use query hinting, where the outer query constraint is used when identifying objects that match the inner query constraint. This may also allow social-networking system 160 to produce better search results and may improve the processing efficiency for generating these results. The query command may be formed using, for example, WAND or SOR operators, such that the query command requires a first number of identified nodes to match the inner constraint, or match the inner or outer constraint, and a second number of identified nodes to match both constraints or just the outer constraint, or any combination thereof. The first and second numbers may be, for example, a real number, a percentage, or a fraction. Although this disclosure describes identifying particular social-graph elements as matching particular query constraints in a particular manner, this disclosure contemplates identifying any suitable social-graph elements as matching any suitable query constraints in any suitable manner.

In particular embodiments, identifying a first set of nodes matching the inner query constraint and at least in part matching the outer query constraint may comprise identifying a first number of nodes matching at least the inner query constraint and identify a second number of nodes matching both the inner query constraint and the outer query constraint. The query command may be formed such that it requires that at least a first number of search results returned in response to the query command match both the inner and outer query constraints, while permitting at least a second number of the search results to match only the inner constraint (e.g. as in the case of using the WAND operator). As an example and not by way of limitation, in response to the structured query "Photos of females taken in Palo Alto", social-networking system 160 may generate a query command to resolve the inner query constraint such as, for example, (WAND
    (term gender_to_user: <female>)
    (term photo_place_tag_to_user: <Palo Alto>: optional-weight 0.9)).

In this case, the inner constraint would be to identify female users, and the outer constraint would be to identify photos of the identified female users taken in the city of Palo Alto. When searching the users vertical 164 to identify matching user nodes 202 for the inner constraint, rather than just specifying that female users should be identified (which may identify numerous female users who are not tagged in any photos in Palo Alto), the query command specifies that at least 90% of the user results must be females who are also tagged in photos in Palo Alto. In this way, the index is denormalized by adding the additional constraint (term photo_place_tag_to_user: <Palo Alto>:optional-weight 0.9). The remaining 10% of the user results need only match the "female" constraint. Thus, query hinting is used so that the outer query constraint is considered when resolving the inner query constraint. Next, the photos vertical 164 could be searched to identify photos taken in Palo Alto where any of the previously identified female users are tagged. Because 90% of the nodes identified by the search of the users vertical 164 are already identified as being female users who have been tagged in photos in Palo Alto, the search of the photos vertical 164 is more likely to be able to produce a relatively large number of photos where the identified females are tagged. Although this disclosure describes identifying particular social-graph elements as matching particular query constraints in a particular manner, this disclosure contemplates identifying any suitable social-graph elements as matching any suitable query constraints in any suitable manner.

In particular embodiments, identifying a first set of nodes matching the inner query constraint and at least in part matching the outer query constraint may comprise identifying a first number of nodes where each node matches either the inner or outer query constraints and identify a second number of nodes where each node matches both the inner and outer query constraints. The query command may be formed such that at least a first number of search results returned in response to the query command match the inner constraint, and that at least a second number of search results match the outer constraint, with the remainder matching either the inner constraint or the outer constraint (e.g. as in the case of using the SOR operator). As another example and not by way of limitation, in response to the structured query "Photos of Mark and women", social-networking system 160 may generate a query command to resolve the inner query constraint such as, for example, (WAND
    (term gender_to_user<female>)
    (SOR: optional-weight 0.8
        (term friend_of: <Mark>: optional-weight: 0.7)
        (term non_friend_in_same_photo: <Mark>:optional-weight: 0.1))).

In this case, the inner constraint would be to identify female users, and the outer constraint would be to identify photos of the identified female users taken with the user "Mark". When searching the users vertical 164 to identify matching user nodes 202 for the inner constraint, rather than just specifying that female users should be identified (which may identify numerous female users who are not tagged in any photos with the user "Mark"), the query command specifies that at least 80% of the user results must be females who also match one of the constraints in the SOR constraint, where the SOR constraint specifies that 70% of the user results must match the (friend_of: <Mark>) constraint, and 10% of the user results must match the (non_friend_in_same_photo: <Mark>) constraint, with the remainder of the search results matching either constraint (or both, if appropriate). Thus, if N is 100, then 20 user results must simply be female, 56 user results must be females who are friends of the user "Mark", 8 user results must be females who are non-friends of "Mark" who happen to be tagged in a photo with "Mark", and 16 user result must be female and either friends of "Mark" or non-friends tagged in a photo with "Mark". In this way, the index is denormalized by adding various additional constraints, which may also help generate diversity of results. Thus, query hinting is used so that the outer query constraint (i.e., being in a photo with the user "Mark") is considered when resolving the inner query constraint. Next, the photos vertical 164 could be searched to identify photos taken with the user "Mark" where any of the previously identified female users are tagged. Because 80% of the nodes identified by the search of the users vertical 164 are already identified as being female users with some type of relationship to the user "Mark", the search of the photos vertical 164 is more likely to be able to produce photos that satisfy the search query. Although this disclosure describes identifying particular social-graph elements as matching particular query constraints in a particular manner, this disclosure contemplates identifying any suitable social-graph elements as matching any suitable query constraints in any suitable manner.

In particular embodiments, social-networking system 160 may score one or more nodes identified as matching a query constraint. The identified nodes may be scored in any suitable manner. When a query command includes a plurality of query constraints, social-networking system 160 may score the nodes matching each query constraint independently or jointly. Social-networking system 160 may score the first set of identified nodes by accessing a data store 164 corresponding to the object-type of the identified nodes. As an example and not by way of limitation, when generating identified nodes matching the query constraint (extract authors: (term posts_liked_by: <Mark>)), social-networking system 160 may identify the set of users (<Tom>, <Dick>, <Harry>) in the user vertical 164. Social-networking system 160 may then score the users <Tom>, <Dick>, and <Harry> based on their respective social-affinity with respect to the user <Mark>. For example, social-networking system 160 of the post vertical 164 may then score the identified nodes of users <Tom>, <Dick>, and <Harry> based on a number of posts in the list of posts liked by the user <Mark>. The users <Tom>, <Dick>, and <Harry> may have authored the following posts liked by the user <Mark>: <post 1>, <post 2>, <post 3>, <post 4>, <post 5>, <post 6>. If user <Dick> authored posts <post 1>, <post 2>, <post 3>, user <Tom> authored posts <post 5> and <post 6>, and user <Harry> authored post <post 4>, social-networking system 160 may score user <Dick> as highest since his authored most of the posts in the list of posts liked by the user <Mark>, with <Tom> and <Harry> having consecutively lower scores. As another example and not by way of limitation, using the prior example, social-networking system 160 may access a forward index that maps a post to a count of likes of the post. The index server may access the forward index and retrieve counts of likes for each post of the list of posts liked by the user <Mark>. The index server may score the posts in the list of posts (i.e., <post 1>, <post 2>, <post 3>, <post 4>, <post 5>, <post 6>) based on respective counts of likes, and return to social-networking system 160 authors of top scored posts (e.g., top 3 scored or most liked posts) as the first identified node. After each appropriate scoring factor is considered for a particular identified node, an overall score for the identified node may be determined. Based on the scoring of the nodes, social-networking system 160 may then generate one or more sets of identified nodes. As an example and not by way of limitation, social-networking system 160 may only generate a set of identified nodes corresponding to nodes having a score greater than a threshold score. As another example and not by way of limitation, social-networking system 160 may rank the scored nodes and then only generate a set of identified nodes corresponding to nodes having a rank greater than a threshold rank (e.g., top 10, top 20, etc.). Although this disclosure describes scoring matching nodes in a particular manner, this disclosure contemplates scoring matching nodes in any suitable manner.

In particular embodiments, social-networking system 160 may score a second set of nodes based at least in part on the scores of a first set of nodes. The search results may be scored in any suitable manner. When a query command includes a plurality of query constraints, social-networking system 160 may score the nodes matching each query constraint separately. Alternatively, social-networking system 160 may utilize the score from one set of nodes when scoring one or more other sets of nodes. For a query command with an inner constraint and an outer constraint, social-networking system 160 may identify a first set of nodes matching the inner query constraint and then score these nodes. Social-networking system 160 may then identify a second set of nodes matching the outer query constraint, and score the second set of nodes based at least in part on the scores of the first set of nodes. As an example and not by way of limitation, in response to the structured query "Pages liked by my friends", social-networking system 160 may generate a query command such as, for example, (pages_liked by: (friends_of: <me>)). Social-networking system 160 may first resolve the inner query constraint by accessing a users vertical 164 and identifying a first set of nodes corresponding to the inner query constraint, which requests users that are friends of the querying user. This first set of users may comprise (<Tom>, <Dick>, <Harry>), who may each correspond to a respective user nodes 202 that is connected by a friend-type edge 206 to the user node 202 of the querying user. Social-networking system 160 may then score this first set of nodes in any suitable manner. For example, the set of users may be scored based on their respective social-graph affinity with respect to the querying user, where the user "Dick" may have the best affinity in the set, "Harry" may have the second-best affinity, and "Tom" may have the worst affinity in the set. Next, social-networking system 160 may resolve the outer query constraint by accessing a pages vertical 164 and identify a second set of nodes corresponding to the outer query constraint, which requests pages liked by the users in the first set (i.e., pages corresponding to concept nodes 204 that are connected by like-type edges 206 to at least one of the user nodes 202 corresponding to the users "Tom", "Dick", and "Harry"). The users "Tom", "Dick", and "Harry" may have liked the following pages: (, , , , ). Social-networking system 160 may then score this second set of nodes in any suitable manner. For example, the set of pages may be scored based on their overall popularity on the online social network, where pages that are more globally popular are scored respectively better than pages that are less popular. The set of pages may also be scored based at least in part on the scores of the first set of nodes. For example,  may be liked by "Tom",  may be liked by "Dick",  may be liked by "Harry",  may be liked by "Tom" and "Harry", and  may be liked by "Tom", "Dick", and "Harry". In this case, social-networking system 160 may score the second set of nodes based on in part of the first set of node by improving the scores of pages liked by users with better affinities and downgrading (or at least improving less) the scores of pages liked by users with worse affinities. For example, since the user "Dick" has the best affinity with respect to the querying user, the pages liked by "Dick" (which are , and ) may all have their scores improved. Similarly, since the user "Tom" has the worst affinity with respect to the querying user, pages liked by "Tom" (which are , , and ) may all have their scored downgraded (or at least not improved as much). After each appropriate scoring factor is considered for a particular identified node, an overall score for the identified node may be determined. Based on the scoring of the nodes, social-networking system 160 may then generate one or more sets of identified nodes. As an example and not by way of limitation, social-networking system 160 may only generate a set of identified nodes corresponding to nodes having a score greater than a threshold score. As another example and not by way of limitation, social-networking system 160 may rank the scored nodes and then only generate a set of identified nodes corresponding to nodes having a rank greater than a threshold rank (e.g., top 10, top 20, etc.). Although this disclosure describes scoring nodes in a particular manner, this disclosure contemplates scoring nodes in any suitable manner.

In particular embodiments, in response to a structured query received from a querying user, social-networking system 160 may generate one or more search results, where the search results correspond to the structured query. Social-networking system 160 may identify objects (e.g., users, photos, profile pages (or content of profile pages), etc.) that satisfy or otherwise match the structured query. A search result corresponding to each identified object may then be generated. As an example and not by way of limitation, in response to the structured query "Photos of Matt and Stephanie", social-networking system 160 may identify a photo where the users "Matt" and "Stephanie" are both tagged in the photo. A search result corresponding to this photo may then be generated and sent to the user. In particular embodiments, each search result may be associated with one or more objects, where each query constraint of the structured query is satisfied by one or more of the objects associated with that particular search result. As an example and not by way of limitation, continuing with the prior example, in response to the structured query "Photos of Matt and Stephanie", social-networking system 160 may parse the query to generate the query command (intersect(photos_of: <Matt>), (photos_of: <Stephanie>)), which could be executed to generate a search result corresponding to a photo where the users "Matt" and "Stephanie" (who were both referenced in the structured query) are both tagged in the photo (i.e., their user nodes 202 are connected by tagged-in-type edges 206 to the concept node 204 corresponding to the photo). In other words, the constraints for (photos_of: <Matt>) and (photos_of: <Stephanie>) are both satisfied by the photo because it is connected to the user nodes 202 for the users "Matt" and "Stephanie". Although this disclosure describes generating search results in a particular manner, this disclosure contemplates generating search results in any suitable manner.

Identifying User Biases for Search Results

Figure 5A:
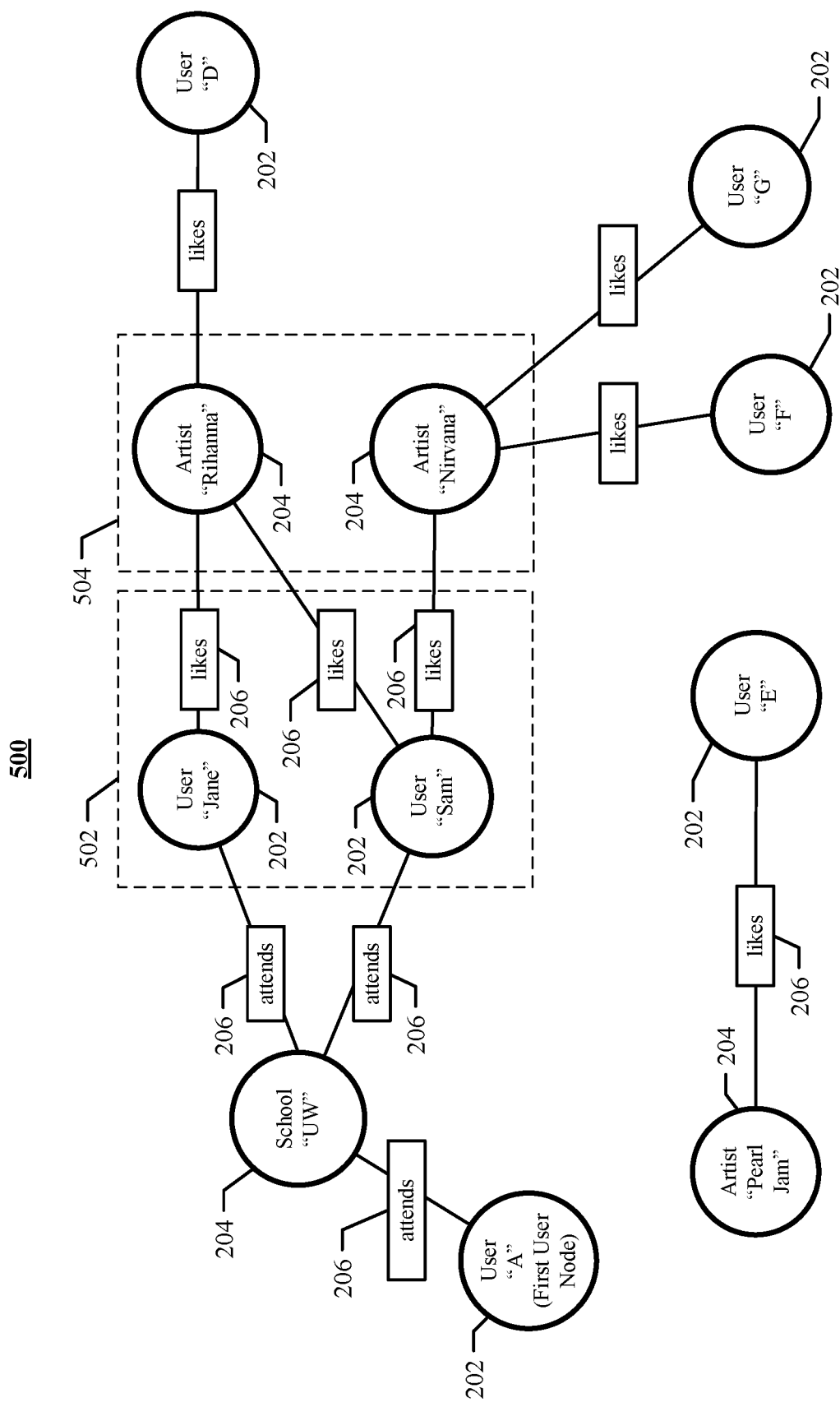
FIG. 5A illustrates a determination of user search bias and identification of search results based on node connections in a social graph.

FIG. 5A illustrates a determination of user search bias and identification of search results based on node connections in a social graph 500. In particular embodiments, to improve the relevancy of search results to a querying user, social-networking system 160 may use user information associated with the querying user to bias search results towards results that are related to the querying user. In one aspect, the search techniques illustrated in FIG. 5A involve an implicit search bias that is determined at least in part based on information associated with the user. This type of bias is referred to herein as an "implicit" bias because the bias is based on information not explicitly specified in the search query. Explicit biases are described in further detail elsewhere herein. As an example and not by way of limitation, a user may provide the query "musicians liked by UW students", and social-networking system 160 may then determine a music genre for a given musician. The example query may be biased by determining that the user tends to enjoy Classical, Alternative and Pop music, and then adding these genres as additional biases to the query. These biases may be added to the query in addition to any explicit biases that may be part of the query, such as a bias toward results liked by or associated with UW students in greater proportion than other members of the social network user population.

In particular embodiments, social-networking system 160 may generate search results based on a user search bias of the querying user (i.e., a user bias). The search results (e.g., the identified nodes or their corresponding profile pages) may be scored (or ranked) and presented to the user according to their relative degrees of relevance to the search query, as determined by the particular search algorithm used to generate the search results. The search results may also be scored and presented to the user according to their relative degree of relevance to the user. In particular embodiments, the search algorithm used to score the search results may be varied based on the user bias of the querying user. User bias may refer to the bias of the querying user, e.g., with respect to the type of search query and/or the type of search mode that the user is in. In response to a search query, social-networking system 160 may determine one or more user biases for the search query. User bias may be determined in a variety of ways, such as, for example, based on social-graph elements referenced in the search query, terms within the search query, user information associated with the querying user (e.g., demographic information, like/check-in activity, or user profile information), search history of the querying user, pattern detection, other suitable information related to the query or the user, or any combination thereof. These biases may be pre-determined by social-networking system 160, or may be calculated in response to particular queries. The querying user's user bias may be determined based on preferences and/or activities of other users who are similar to the querying user (e.g., user's sharing similar demographic attributes as the querying user). The similar users are identified by shared attributes that represent user information they have in common with the querying user. The similar users correspond to a sub-population of the overall group of social network-users. The sub-population may be used to identify search results to be boosted in ranking. For example, search results whose social graph nodes are connected by edges to users in the sub-population may be boosted or otherwise biased. Each search result may be assigned a feature value or weight based upon a comparison of the percentage of users in the sub-population who are connected with (e.g., like) each search result to the percentage of users in the overall social-network population who are connected with each search result. In particular embodiments, the search algorithm used to generate search results may be modified based on these user biases, such that the way search results are ranked in response to one query may be different from the way search results are ranked in response to another query. Although this disclosure describes determining particular user biases in a particular manner, this disclosure contemplates determining any suitable user biases in any suitable manner.

In particular embodiments, social-networking system 160 may determine one or more user biases based on user information, such as information from a user-profile page associated with the querying user. User information may include characteristics of users such as age, income, geographic location, gender, sex, school attended, home town, nationality, language(s) spoken, etc. User information may be represented by nodes 204 and edges 206, for example, as illustrated in the social graph 500 of FIG. 5A. As an example and not by way of limitation, the social graph 500 indicates that a querying user "A", represented by a first user node "A" 202, is a student of the University of Washington ("UW"). This user information is represented by an "attends" edge 206 connecting the first user node "A" 202 to the School "UW" node 204. Two other users, Jane and Sam, also attend UW, as indicated by "attends" edges 206 connecting the UW node 204 to "Jane" and "Sam" user nodes 202. The querying user may be associated with a particular user node 202 of the social graph 200, and may also be associated with a particular user-profile page. Particular user information may correspond to particular user biases. As an example and not by way of limitation, where a querying user has indicated on his user-profile page that he is "single" in a relationship-status field (i.e. not in a relationship), social-networking system 160 may determine that this user-profile information corresponds to a bias for dating. Social-networking system 160 may then determine that particular structured queries from this querying user are more likely to be associated with a dating user bias. As another example and not by way of limitation, where a querying user has indicated on her user-profile page that she is "unemployed" in a work-history field, social-networking system 160 may determine that this user-profile information corresponds to a bias for networking. Social-networking system 160 may then determine that particular structured queries from this querying user are more likely to be associated with a networking bias. Although this disclosure describes determining user biases based on particular user information in a particular manner, this disclosure contemplates determining user biases based on any suitable user information in any suitable manner. As an example and not by way of limitation, user information may include or be based on nodes connected to the user's node, such as friends, likes, photos, interests, and so on, subject to appropriate privacy restrictions. Note that user characteristics are also referred to herein as user attributes.

Referencing the example illustrated in FIG. 5A, social-networking system 160 may use the user information associated with the querying user represented by the first user node "A" 202 and with other users who are related to user A by shared user attributes, such as Jane and Sam, to generate a user bias 502. The user bias 502 may include one or more user nodes, e.g., "Jane" and "Sam" 202, that correspond to users who are related to the querying user A by shared user attributes. The user bias 502 may also include one or more edge types, which are types of the edges that connect the user nodes 202 in the user bias 502 to other nodes 204, such as the Artist "Rihanna" and Artist "Nirvana" nodes 204. In particular embodiments, user nodes are related to the querying user by shared user attributes if, for example, the user nodes include or are associated with user information that is also associated with the user.

In particular embodiments, social-networking system 160 may identify a plurality of user nodes corresponding to a plurality of users, respectively, having user attributes matching a user attribute of the querying user. As an example and not by way of limitation, referring again to FIG. 5A, a user bias, such as "musicians liked by UW students," may be generated from the user information in the social graph 500. Starting with the users node 202 of the querying user A, other users 202 who share user attributes with the querying user can be identified. The querying user A has a user attribute "attends UW", and the attribute is represented by an attended edge between user A's user node 202 and the UW node 204. The graph may now be searched for other users who have one or more of the same user attributes as user A. Starting at the UW node 204, two attends-type edges 206 lead to two other users, Jane and Sam, who attend UW. Jane and Sam are related to user A because all three users share the user attribute of attending UW. These two users form a sub-population 502 that is related to the querying user A. Once related users are known, the query and/or its results can be biased toward musicians liked by those related users. As shown by the "likes" edges 206, the musician liked by Jane is Rihanna 204, and the musician liked by Sam is Nirvana 204. Rihanna and Nirvana may be boosted towards the top of the search results, or may be placed at the top of the search results, or may be used as the only search results, depending on how much weighting is desired to be given to the user biasing.

In particular embodiments, a process may identify the bias and identify the biased search results. That is, a process may identify the users who share user attributes and continue on by identifying nodes biased by those users. As an example and not by way of limitation, referring to FIG. 5A, starting with user A, the other users Jane and Sam who share user attributes with user A may be identified by searching the graph (e.g., starting from the node 204). The nodes associated with Jane and Sam may then be identified by following edges 206 from the Jane and Sam nodes 202. Like-type edges 206 may be followed, but other edge types may be followed as well. Any type of edge that indicates a correlation between nodes may be followed, though different types of edges may be weighted differently when biasing search results.

In particular embodiments, a process may identify the user bias and store a representation of the bias for later use. In this way, the representation of the bias may be retrieved when a search is performed and used to identify biased nodes. This process may provide efficiency benefits, because the user bias may be determined once and re-used for multiple searches. In this example, the user bias "liked by UW students" has been identified based on the information in the social graph. Once the user bias has been identified, it may be used to bias search results. Given the bias "liked by UW students", the search results may be biased by identifying the specific user nodes that represent UW students, and boosting the rankings of search results that are liked by (or otherwise related to) the identified user nodes. The user node Jane 202 is connected to an Artist node Rihanna 204 by a likes edge 206. Therefore, Rihanna should be included and/or boosted in results for the "musicians" query. Similarly, the user node Sam 202 is connected to an Artist node Nirvana 204 by a like-type edge 206, and Nirvana should be included and/or boosted in results for the "musicians" query. The nodes Rihanna and Nirvana 204 are user-biased nodes 504. To apply the user bias, search queries may be rewritten or extended to include conditions based on the user bias. Search results produced by existing queries may be biased by filtering and/or reordering the results to conform to the user bias.

In particular embodiments, the representation of a determined user bias need not be updated as users are added and removed from the social networking system. As an example and not by way of limitation, the user bias "liked by UW students" need not change as users are added or removed from the online social network. The condition "liked by UW students" may be added to a search query, if the query language supports it. Instead of relying on query language support for the user bias condition, additional queries may be performed and combined to identify the query results that conform to the user bias. To bias search results toward results liked by UW students, an additional step may be performed to identify related users (e.g., UW students). The query results liked by those users may then be boosted or biased to place them above other query results.

In particular embodiments, a determined user bias may be user-dependent. As an example and not by way of limitation, the user bias may also be expressed as "liked by Jane", "liked by Sam", or "liked by Jane and Sam". This bias is user-dependent, and may need to be updated or re-determined as users are added or removed from the online social network. The condition "liked by Jane or Sam" may be added to a search query, if the query language supports it. Instead of using query language features, the results of a query such as "musicians" may be filtered to include only musicians liked by Jane or Sam, or to boost or otherwise bias such musicians in the search results presented to the user.

Figure 5B:
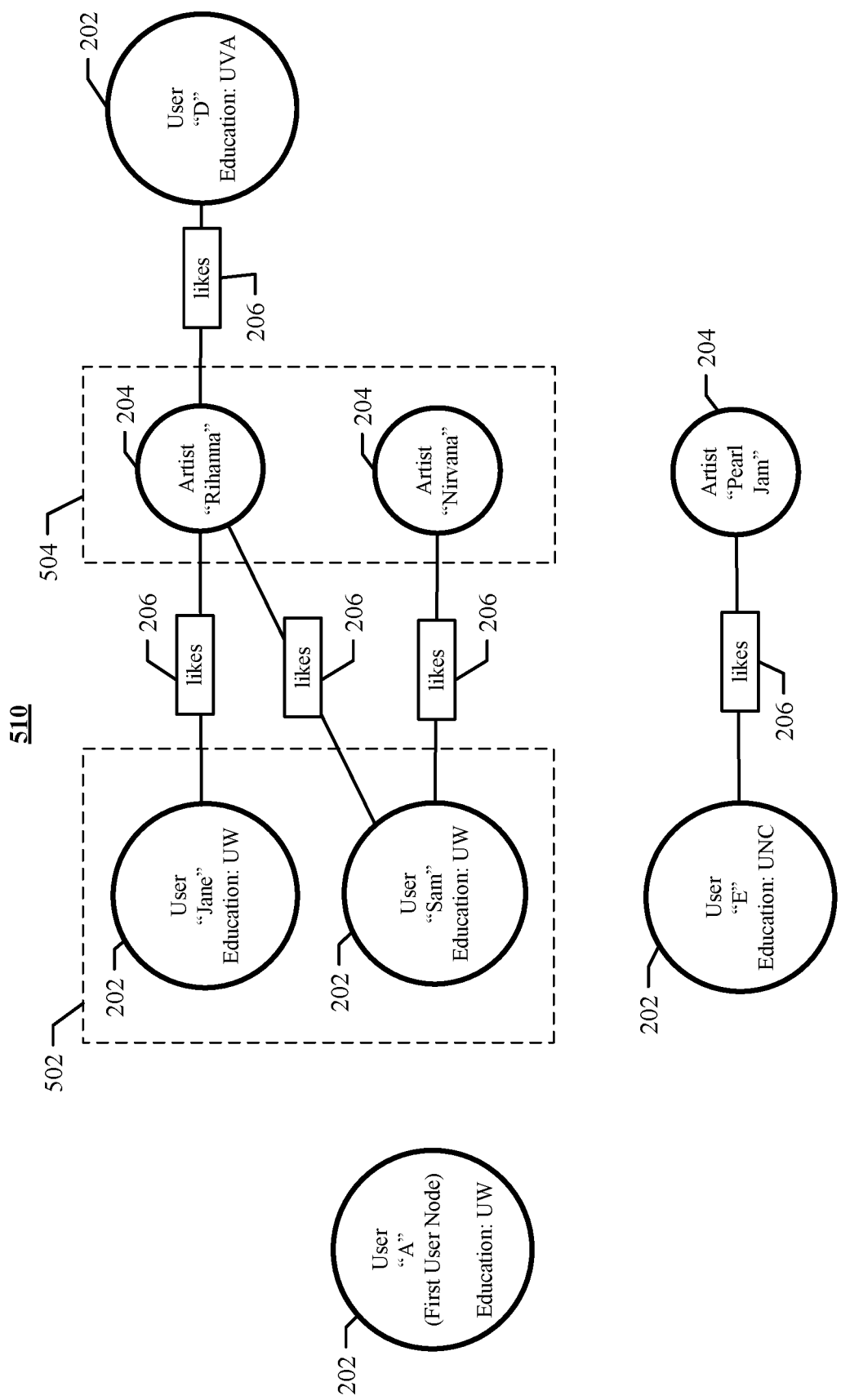
FIG. 5B illustrates a determination of user search bias and identification of search results based on node attributes in a social graph.

FIG. 5B illustrates a determination of user search bias and identification of search results based on node attributes in a social graph. In particular embodiments, user bias may be determined based on user attributes stored in data fields of user nodes, as shown in FIG. 5B. As an example and not by way of limitation, the fact that a user is a student of UW may be represented by a data field "Education: UW" of the user "A" node 202 instead of by a connection to a node that represents UW. Node data fields may have names, e.g., "Education", and values, e.g., "UW". The Education data fields of nodes in the social graph can therefore be queried to identify users who are or were UW students.

As an example, and not by way of limitation, starting with the user node 202 of the querying user A, other users 202 who share user attributes with the querying user may be identified. The querying user A has a user attribute "Education: UW", and the attribute is represented by a data field of the user A node 202. The graph may now be searched for other users who have the same user attributes as user A. A search of user nodes 202 for nodes having the field "Education: UW" identifies the Jane and Sam nodes 202. These two users form a sub-population 502 that is related to the querying user A by one or more shared attributes. Once related users are known, the query and/or its results can be biased toward musicians liked by those related users. As shown by the likes edges 206, the musician liked by Jane is Rihanna 204, and the musician liked by Sam is Nirvana 204. The query and/or its results may therefore be biased toward Rihanna and/or Nirvana in this example.

Figure 5C:
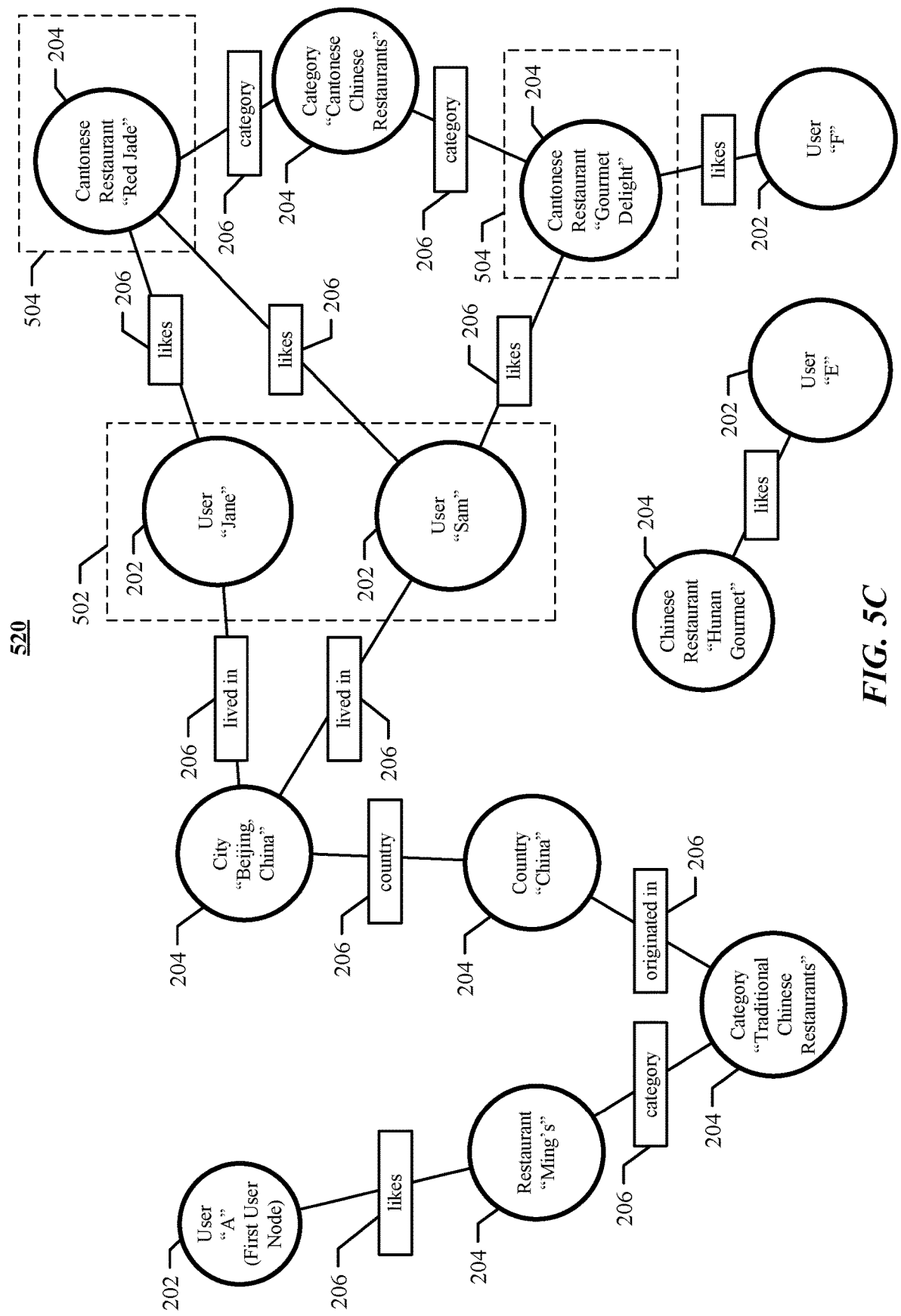
FIG. 5C illustrates a determination of user search bias and identification of search results based on a sequence of node connections in a social graph.

FIG. 5C illustrates a determination of user search bias and identification of search results based on a sequence of node connections in a social graph. As an example and not by way of limitation, a user may specify the search query "Chinese restaurants." The query can be refined by biasing it toward things the user might like. As an example and not by way of limitation, to identify traditional Chinese restaurants, the query can be refined automatically to select Chinese restaurants liked by people who have lived in China. Similarly, to identify non-traditional Chinese restaurants, the query can be refined to select Chinese restaurants liked by people who have not been to China. The type of restaurant that the user likes can be determined based on, for example, social-graph information about restaurants the user has previously been to, checked in at, or liked, or user-profile information such as the user's places of birth and residence. If the user likes to go to traditional Chinese restaurants, and the user searches for Chinese restaurants, then the query should be biased toward traditional ones. If the user searches for "restaurants," then any results that are Chinese restaurants should be biased towards traditional Chinese restaurants.

In the example of FIG. 5C, the querying user A 202 does not directly share a user attribute with other users, but does indirectly share user attributes with the users Jane and Sam 202, so a sub-population 502 may be established. A user bias of "users who lived in China" may then be established, since China is linked (indirectly) to the querying user node A 202 by a path of through one or more user bias nodes. User bias nodes may represent user bias information. The types of nodes that are considered to be user bias nodes depend on what is and what is not considered user bias information. As an example and not by way of limitation, a user node linked to another node by a friend edge may be considered a user bias node if friends are considered user bias information. The particular definition of user bias information may be based on factors such as privacy policies, size of the social graph, user preferences, historical usage patterns, and so on.

In the example of FIG. 5C, the querying user A 202 submits a query for "Chinese restaurants." In this example, user A likes the restaurant Ming's 204, but the other users in the graph do not have any connections to Ming's 204. A user bias may still be established, however, by searching for indirectly-shared user attributes. Two users may be said to indirectly share user attributes if a path of user-bias nodes 202,204 and edges 206 exists between the nodes 202 of the two users. User A likes traditional Chinese restaurants, which may be inferred from A's like of Ming's. Ming's is a traditional Chinese restaurant according to a category edge 206 that links Ming's 204 to the category "Traditional Chinese Restaurants." The Traditional Chinese Restaurants node 204 is linked to the China country node 204 by an "originated in" edge 206. The China country node 204 is linked to the Beijing, China city node 204 by a country edge 206. The Beijing, China city node is linked to the user nodes Jane 202 and Sam 202 by "lived in" edges 206. Since the Jane and Sam nodes 202 are user nodes, and are linked to the querying user A's node 202 by a path of user-bias nodes, Jane and Sam are related to the querying user. Therefore, the search results may be biased toward any Chinese restaurants liked by Jane or Sam. Jane likes the Cantonese restaurant Red Jade 204, and Sam likes the Cantonese restaurant Gourmet Delight 204, as shown by the likes edges 206 between the respective nodes. The restaurant nodes Red Jade and Gourmet Delight 204 are user-biased nodes 504, and may be boosted in the results for the query "Chinese restaurants." In this example, user E 202 likes the Chinese restaurant Hunan Gourmet 204, but user E does not share any user attributes with querying user A, so the restaurant Hunan Gourmet is not biased in the search results.

In particular embodiments, social-networking system 160 may determine one or more user biases based on one or more query constraints of the query command generated in response to the structured query. In response to receiving a structured query from the querying user, social-networking system 160 may generate a query command based on the structured query, where the query command may comprise one or more query constraints. Particular query constraints may correspond to particular user biases. As an example and not by way of limitation, for the structured query "Single women in Palo Alto", social-networking system 160 may generate a query command such as, for example, (intersect (user_gender: <female>, user_location: <Palo Alto>, user_relationship_status: <single>)). Social-networking system 160 may then determine that the query constraint for (user_gender: <female>) corresponds to a bias for dating. Although this disclosure describes determining user biases based on particular query constraints in a particular manner, this disclosure contemplates determining user biases based on any suitable query constraints in any suitable manner.

In particular embodiments, social-networking system 160 may determine one or more user biases based on a search history associated with the querying user. User biases previously determined for the querying user may be more likely to match the user bias of the querying user's current search query. As an example and not by way of limitation, if the querying user has previously run search queries that social-networking system 160 has determined correspond to a dating bias, when determining the probability that subsequent search queries correspond to a particular user bias, social-networking system 160 may determine that the dating bias has a relatively higher probability of corresponding to the subsequent search query because the querying user has previously run search queries having that bias. As another example and not by way of limitation, if the querying user has never run search queries that social-networking system 160 has determined correspond to a networking bias, when determining the probability that subsequent search queries correspond to a particular user bias, social-networking system 160 may determine that the networking bias has a relatively lower probability of corresponding to the subsequent search query because the querying user has never run search queries having that bias. Although this disclosure describes determining user biases based on particular search history information in a particular manner, this disclosure contemplates determining user biases based on any suitable search history information in any suitable manner.

In particular embodiments, social-networking system 160 may determine one or more user biases based on one or more n-grams from the structured query. The n-gram may be any contiguous sequence of n items from the structured query, which may include character strings or social-graph references. Particular n-grams may correspond to particular user biases. Although this disclosure describes determining user biases based on particular query terms in a particular manner, this disclosure contemplates determining user biases based on any suitable query terms in any suitable manner.

In particular embodiments, social-networking system 160 may generate the query command based on one or more user biases. The structure of a query command generated by social-networking system 160 may be modified based on these user biases, such that the way a query command is generated in response to one structured query may be different from the way a query command is formed in response to another structured query. Similarly, one or more query constraints of a query command may be based on these user biases. Thus, as an alternative to, or in addition to, scoring/ranking search results based on user bias, the user biases may affect the way search results are identified by social-networking system 160 when executing a query command. In particular embodiments, rather than altering the ranking of results based on an inferred bias, social-networking system 160 may rewrite the query to generate a query command that reflects the bias. As an example and not by way of limitation, in response to the text query "Chinese restaurants," social-networking system 160 may generate a structured search query such as "Chinese restaurants liked by people who lived in China," or even "Traditional Chinese restaurants." Thus, the results retrieved from a pages-vertical already match the user's bias, and there is no need to re-rank of the results (although the ranking may be still be altered, if appropriate). The query command may also use SOR (strong OR) functionality such that entities liked by other users that are share one or more user biases with the querying user are included in the search results. As another example and not by way of limitation, if social-networking system 160 infers the user prefers traditional Chinese restaurants, a search query for Chinese restaurants can be generated and users with an inferred similar bias for traditional Chinese restaurants (e.g. have lived in China) can be SORed with the results from the search query. As another example and not by way of limitation, biases to identify particular nodes or node-types, identify nodes using query hinting, identify nodes using inverse operators, exclude converse search results, exclude inner search results, exclude duplicate results, other suitable biases, or any combination thereof may be used when generating a query command (or a particular query constraint of the query command) in response to a structured query received by social-networking system 160. Although this disclosure describes generating query commands based on particular user biases in a particular manner, this disclosure contemplates generating query commands based on any suitable user biases in any suitable manner.

Figure 6A:
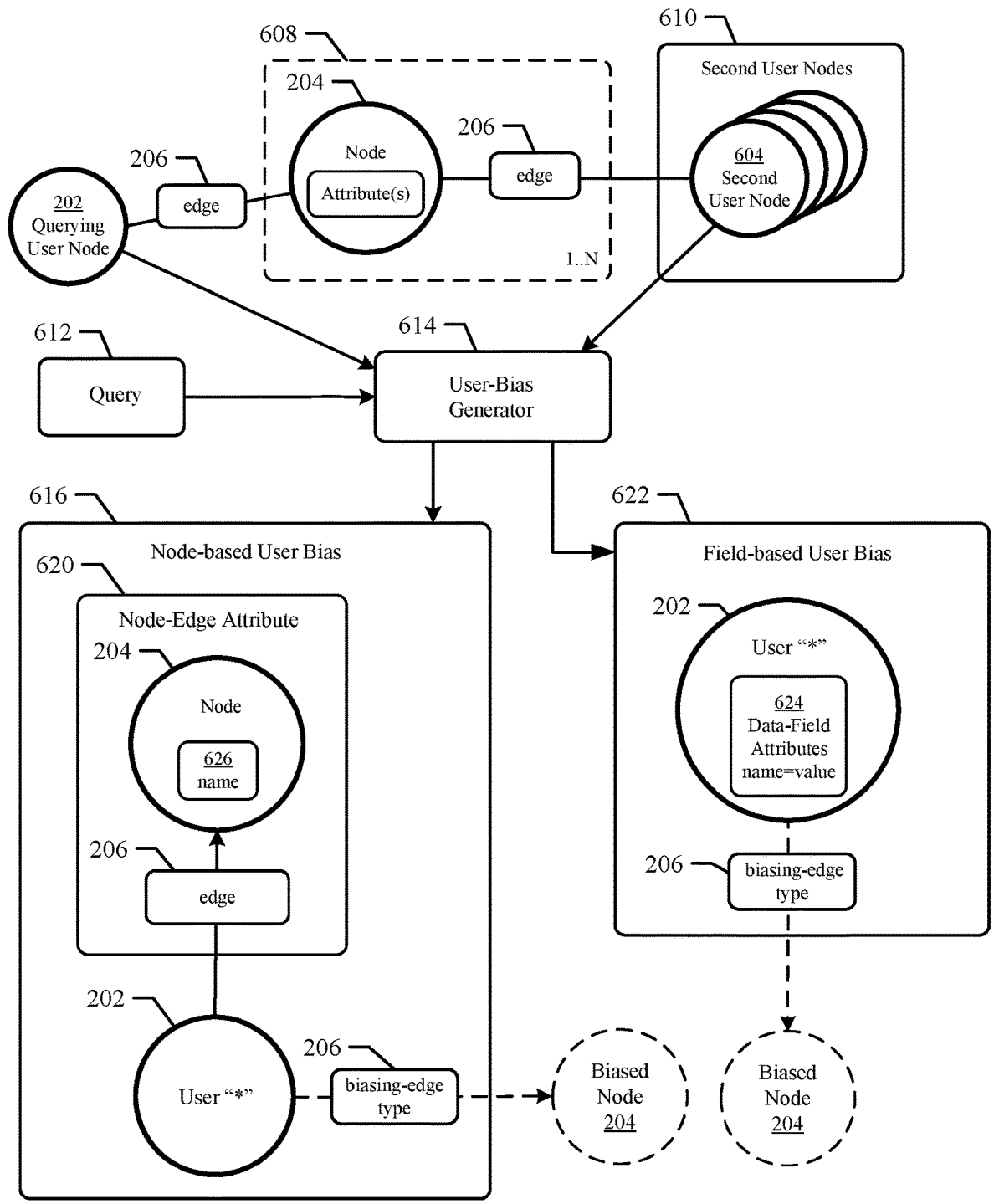
FIG. 6A illustrates user bias objects.

FIG. 6A illustrates user bias objects 616, 622. In particular embodiments, a user bias object represents a particular bias, e.g., "nodes liked by users who are UW students." A user bias object 616 may be used to determine whether specified nodes match a particular user biases represented by a bias object 616. As an example and not by way of limitation, search results can be biased toward results that match a particular user bias by checking whether each search result's node matches the user bias object 616. If a node does match the user bias object 616, e.g., is a node liked by users who are UW students, then the node may be biased by, for example, boosting its ranking in the search results. As an example and not by way of limitation, search results that match the bias may be displayed to the querying user, while search results that do not match the bias are not displayed. A numeric boost value or feature value may be determined for each search result using probabilistic TF-IDF techniques. Other techniques may also be used to quantify or weight the boost, such as counting the number of UW students who like the node and boosting the corresponding search result by an amount proportional to that number of UW students.

As an example, and not by way of limitation, the user bias 616 includes a UW school node 204 connected to a user node 202 by an "attends" edge 206, and further includes a "likes" edge type 206. The bias 616 may be used to determine whether a particular node is a biased node 204, e.g., a node to be biased in search results. To determine whether a node 204 is biased by the user bias 616, the node 204 may be evaluated to determine if it has the connections shown in the user bias 616. Therefore, a node 204 is biased by the bias 616 if the node is connected to a user node 202 by a likes edge, and the user node is connected to a school node 204 named UW by an attends edge 206.

As an example, and not by way of limitation, the Artist Rihanna node 204 and the Artist Nirvana node 204 are biased by the user bias 616 because, as shown in FIG. 5A, the Rihanna and Nirvana nodes 204 are connected to user nodes (Jane and Sam, respectively) by likes edges, and the user nodes are connected to a school node 204 named UW by attends edges 206. Therefore, the Rihanna and Nirvana nodes are biased by the user bias 616. The biasing user node 202 of the bias 616 is shown as having a name "*" to indicate that a node of any name having an attends connection to a UW node and a likes connection to a node 204 satisfies the bias 616. The user node 202 itself need not be included in the node-based user bias 616, since the attribute 620 and the edge type 206 stored in the bias 616 are sufficient to determine whether a node 204 satisfies the user bias condition. Therefore, the user node 202 may be considered to be an implied part of the node-based user bias 616.

A user-bias generator 614 may generate user bias objects 616 for subsequent use in biasing searches or search results. The user bias objects 616 may be used to rewrite a search query or to re-rank or filter search results produced by a query. As an example and not by way of limitation, search results that match graph elements specified in the user bias objects 616 may be biased, e.g., by boosting their rankings. The user bias object 616 represents a user bias as a combination of an attribute, e.g., "UW student", and an edge type, e.g., "likes". The attributes are understood to be attributes of user nodes. Since the user node 202 is implicit in each node-based user bias object 616, a specific user need not be not specified in the bias object 616. The combination of the attribute and edge type represents the user bias, e.g., "UW student"+likes="nodes liked by users who are UW students".

In particular embodiments, search results may be compared to the user bias 616, and biased if they match the user bias 616. As an example and not by way of limitation, a node Nirvana 204 shown in FIG. 5A is compared to the bias to determine if it is liked by any users who are UW students. The comparison may be performed by checking for a likes edge connecting the Nirvana node to a user who has the attribute "UW student." If such a likes edge exists, then the node Nirvana matches the user bias 616, and may be biased or boosted in the search results. The user-bias generator 614 may receive the user node 202 of the querying user, the query 612, and one or more second user nodes 610 that share user attributes 608 with the user node 202. The bias generator 614 may use those items to generate the user bias objects 616, 622. The user-bias generator 614 may use the method shown in FIG. 7B to generate the user bias objects 616, 622. The user bias objects 616, 622 may subsequently identify and bias search results using the method shown in FIG. 7C.

Two types of user bias objects 616, 622 are shown in FIG. 6A: a node-based user bias 616 and a field-based user bias 622. The two different representations of user bias correspond to two different ways that attributes may be represented in social graph nodes: (1) a "node-based user bias" 616, represented by a node 204 connected to the user node by an edge 206, e.g., a UW node connected to a user node by an attends edge, and (2) a "field-based user bias" 622, represented by data field attribute(s) 624 of a user node 202, e.g., a user node having a field 624 "Education: UW". That is, in a node-based user bias 616, an attribute that indicates a user is a UW student may be represented in the social graph as a UW node connected to the user's node 202 by an "attends" edge. Each node in a set of search results may be evaluated to determine if it matches the user bias 622, as described below. If a node matches the bias 622, then the node may be biased, e.g., boosted, in the search results. In particular embodiments, the node 204 and edge type 206 of the node-based user bias 616 may be represented together as a node-edge attribute 620. The node-edge attribute 620 may be understood as an attribute that a search result (or other type of node) should have in order to match the user bias 616. In particular embodiments, in the case of the node-based user bias 616, a candidate node, such as a search result node shown as Biased Node 204, matches the bias 622 if the candidate node is connected to any user node 202 by an edge of biasing-edge type 206, and the user node 202 is connected to a node that matches the node 204 of the node-edge attribute 620 (or to the node 204 itself) by an edge of the same type as the edge 206 (or by the edge 206 itself). Two different nodes may be considered matching if, for example, they have the same name and/or identifier, but other node matching criteria are possible. As an example and not by way of limitation, two nodes may be considered matching if both their names and types match, or, in another example, if all of their data fields match.

Alternatively, in particular embodiments, in a field-based user bias 622, an "Education: UW" data field of the user's node 202 may indicate that the user is a UW student. This type of attribute is referred to herein as a data-field attribute 624. Each node in a set of search results may be evaluated to determine if it matches the user bias 622, as described below. Each of these "candidate" nodes that match the bias 622, may be biased, e.g., boosted, in the search results. The field-based user bias 622 includes a data-field attribute 624 representing an attribute that a user node matching user node 202 (or user node 202 itself) connected to a candidate search result should have, and a biasing-edge type 206, indicating a type of edge by which the candidate search result should be connected to a user node matching the user node 202 (or the user node 202 itself), in order for the candidate search result to match the user bias 622. In other words, to match, the search result, shown as Biased Node 204, should be connected to a user node 202 by an edge of biasing-edge type 206, and the user node 202, and the user node 202 should have a data field attribute equal to the data field attribute 624 specified in the node 202 of the field-based user bias 622. Other matching criteria are possible. As an example and not by way of limitation, there may be multiple data fields in the node 202, all of which should match corresponding fields of the search result node for the bias to be considered matching. A search result node 204 matches the user bias 622 if the search result node 204 is connected to a user node 202 by an edge of biasing-edge type 206, and the search result node has the same data field attributes 624 as the user bias's node 202. Examples of the user bias objects for particular scenarios are shown in FIGS. 6B and 6C.

Figure 6B:
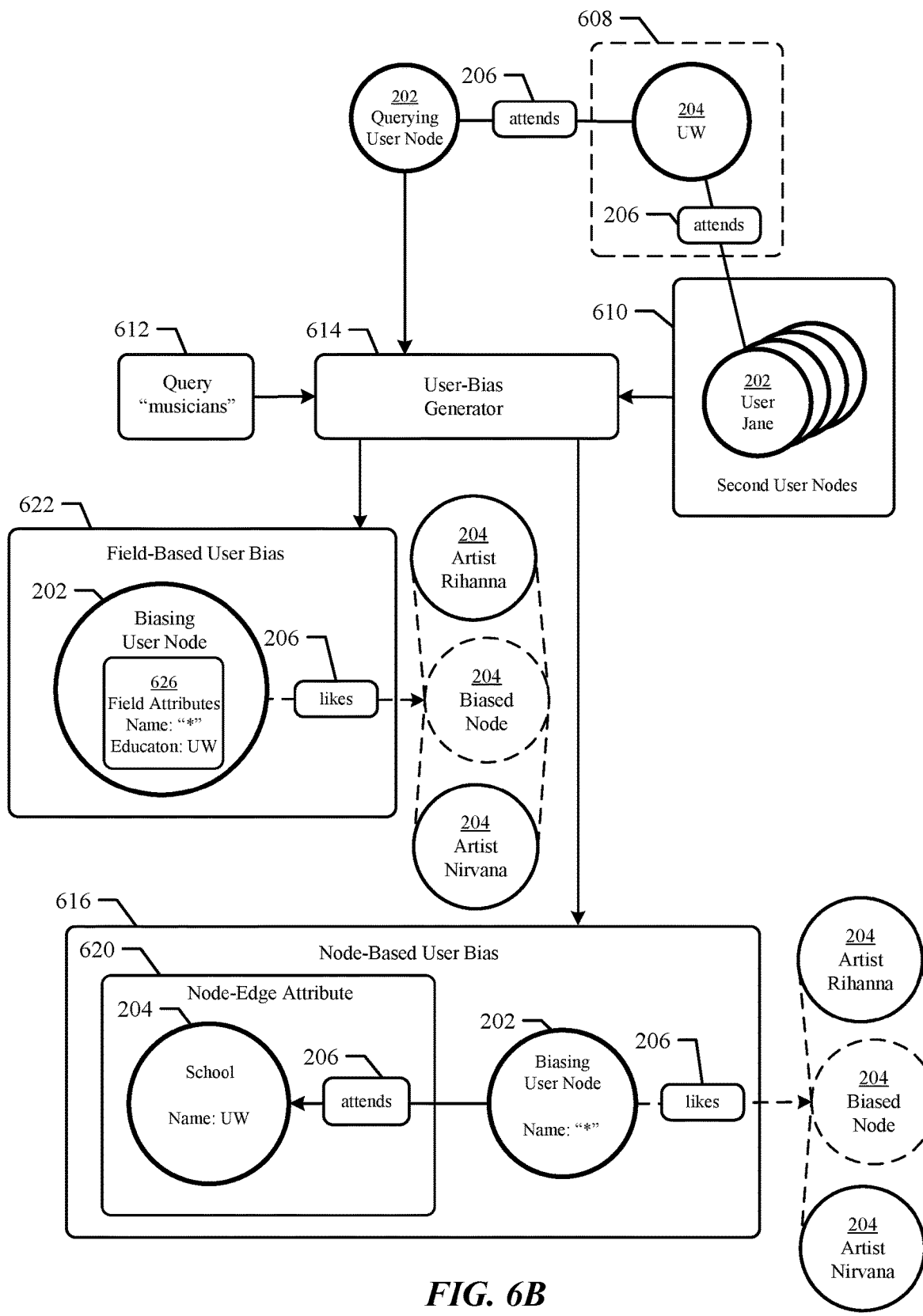
FIGS. 6B and 6C illustrates examples of user bias objects generated in the search scenarios

FIG. 6B illustrates examples of user bias objects generated in the musicians search scenario of FIG. 5A. The user-bias generator 614 receives the querying user node 202, the "musicians" query 612, and the second user nodes 610, and generates a field-based user bias 622 (for attributes represented as data fields) and/or a node-based user bias 616 (for attributes represented as nodes connected to edges).

In particular embodiments, the user-bias generator 614 may generate the user biases 616, 622 based on the structure of the user attributes shared by the querying user node 202 and the second user nodes 610. Since the structure of the shared attribute "attends UW" is a UW school node 204 having an attends edge, the generated biases 616, 622 that detect whether a given node shares the same user attributes have a similar structure. An example field-based user bias 622 represents the user bias "nodes liked by users who are UW students." Bias 622 represents the attribute "UW students" as a field of the user node 202, and matches biased nodes 204 that are connected to user nodes having the field "Education: UW". Bias 622 includes a user node 202 having field attributes 626, which include the field Education: UW 626. The nodes Rihanna 204 and Nirvana 204 of FIG. 5A do not have field attributes "Education: UW" and therefore do not match the field-based user bias 622 of FIG. 6B. The nodes Rihanna 204 and Nirvana 204 of FIG. 5B match the field-based user bias because they have field attributes named "Education" with the value "UW". The node-based user bias 616 represents the user bias 616 "nodes liked by users who are UW students." Bias 616 represents the attribute "UW students" as a node 204 connected to a user node 202 by an attends edge 206, and matches biased nodes 204 that are connected to user nodes having that structure. Bias 616 includes a node-edge attribute 620, which in turn includes a school UW 204 node and an attends 206 edge. The nodes Rihanna 204 and Nirvana 204 match the user bias 616, since they are connected to user nodes (Jane and Sam 202) that are in turn connected to a school UW node by an attends edge 206. Therefore, the bias 616 indicates that the nodes Rihanna 204 and Nirvana 204 should be biased.

Figure 6C:
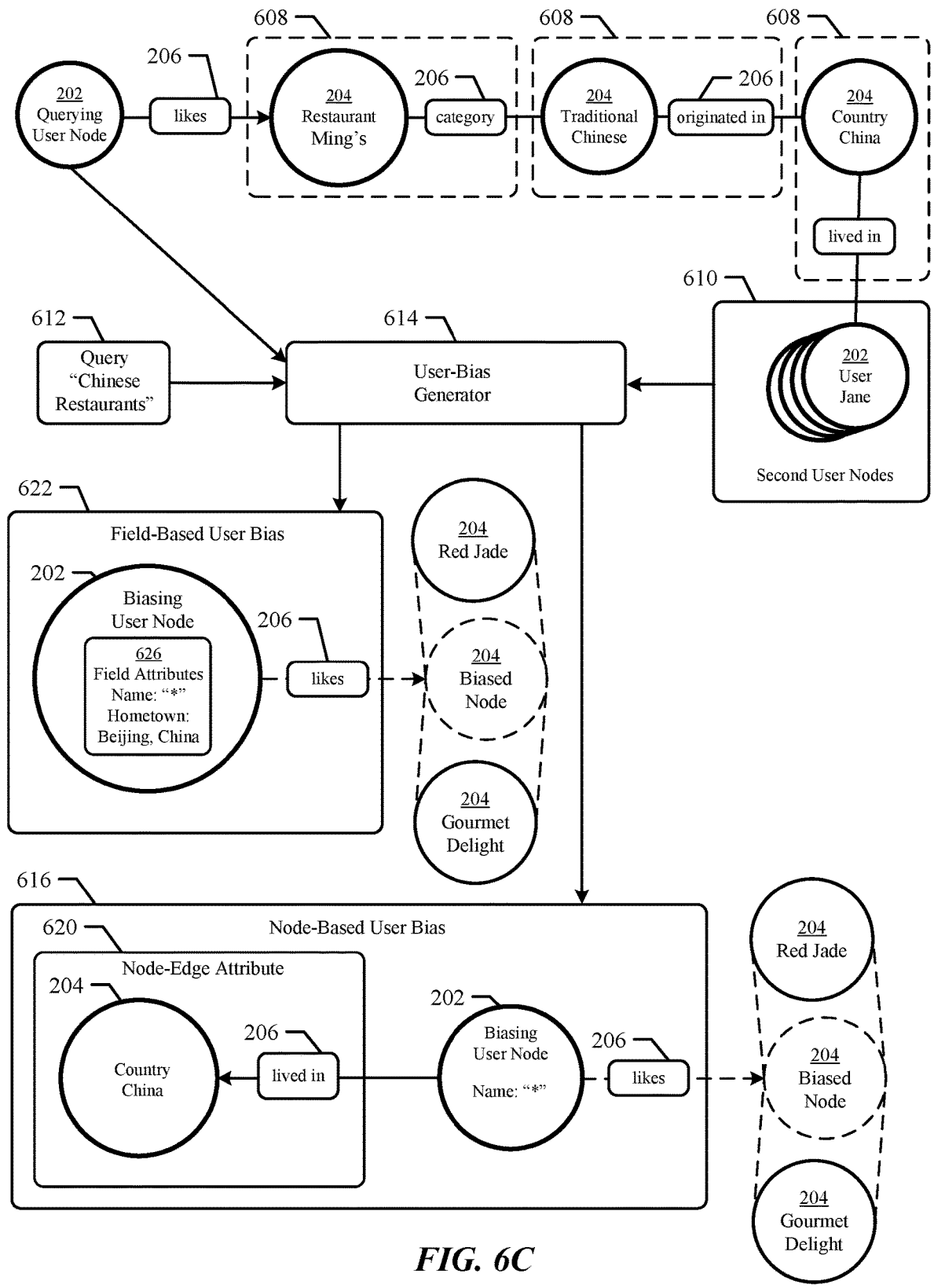

FIG. 6C illustrates examples of user bias objects generated in the restaurants search scenario of FIG. 5B. The user-bias generator 614 receives the querying user node 202, the "Chinese restaurants" query 612, and the second user nodes 610, and generates a field-based user bias 622 (for attributes represented as data fields) and/or a node-based user bias 616 (for attributes represented as nodes connected to edges). As described above with reference to FIG. 5C determination of user search bias may be based on a path or sequence of node connections in a social graph. In FIG. 5C, the querying user A 202 does not directly share a user attribute with other users, but does indirectly share user attributes with the users Jane and Sam 202 through a path of related user-bias nodes, so a sub-population 502 may be established. A user bias of "users who lived in China" may then be established, since China is indirectly linked to the querying user node A 202 by a path of user-bias nodes.

In particular embodiments, the user-bias generator 614 may generate the user biases 616, 622 based on the structure of the user attributes shared by the querying user node 202 and the second user nodes 610. As an example, and not by way of limitation, since the attribute directly connected to the secure user nodes 610 is the "lived in China" attribute, the generated user biases 616, 622 check for that attribute, along with a connecting likes edge, on a given search result node to determine whether the search result node is biased by the bias 622. The field-based user bias 622 represents the user bias "nodes liked by users whose hometown is Beijing, China." The field-based bias 622 represents the attribute "Hometown: Beijing, China" as a field of the user node 202, and matches biased nodes 204 that are connected to user nodes 202 having the field data "Hometown: Beijing, China" 626. The nodes Red Jade 204 and Gourmet Delight 204 in FIG. 5C do not match the attribute-based user bias 622, but would match if they had a field attribute named "Hometown" with the value "Beijing, China".

As an example, and not by way of limitation, the node-based user bias 616 represents the user bias 616 "nodes liked by users whose hometown is Beijing, China." The node-based bias 616 represents the attribute "lived in China" as a node 204 connected to a user node 202 by a "lived in" edge 206, and matches biased nodes 204 that are connected to user nodes having that structure. The nodes Red Jade 204 and Gourmet Delight 204 match the user bias 616, since they are connected to user nodes (Jane and Sam 202) that are in turn connected to a City Beijing, China node by a "lived in" 206. Therefore, the bias 616 indicates that the nodes Jane 204 and Sam 204 should be biased.

Figure 7A:
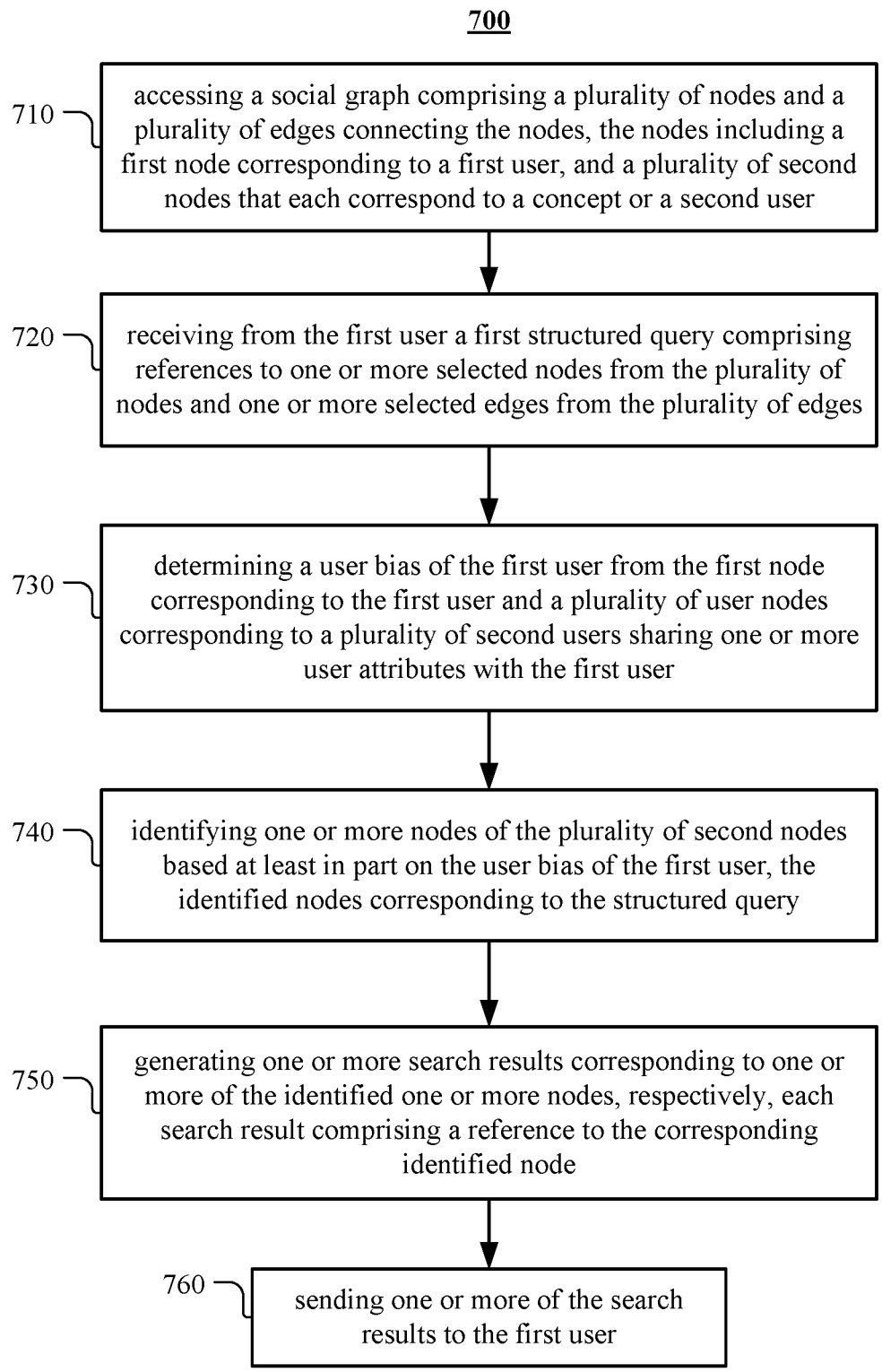
FIG. 7A illustrates an example method for determining user search bias and identifying search results in a social graph.

FIG. 7A illustrates an example method for determining user search bias and identifying search results in a social graph. The method may begin at step 710, where social-networking system 160 may access a social graph 200 comprising a plurality of nodes (e.g., user nodes 202 or concept nodes 204) and a plurality of edges 206 connecting the nodes. Each edge between two nodes may represent a single degree of separation between them. The nodes may comprise a first node (e.g., a first user node 202) corresponding to a first user associated with the online social network. The nodes may also comprise a plurality of second nodes that each correspond to a concept or second user associate with the online social network. At step 720, social-networking system 160 may receive from the first user a first structured query comprising references to one or more selected nodes from the plurality of nodes and one or more selected edges from the plurality of edges. Block 730 determines a user bias of the first user from the first node corresponding to the first user and a set of user nodes corresponding to a set of second users sharing user attribute(s) with the first user. The set of second users corresponds to the sub-group 502. Block 740 performs the biased search by identifying nodes from the set of second nodes based on the user bias of the first user, the identified nodes corresponding to the structured query. Block 750 generates search results that include the nodes identified by the search in block 740. Block 760 sends the search results to the querying user, e.g., for display.

Figure 7B:
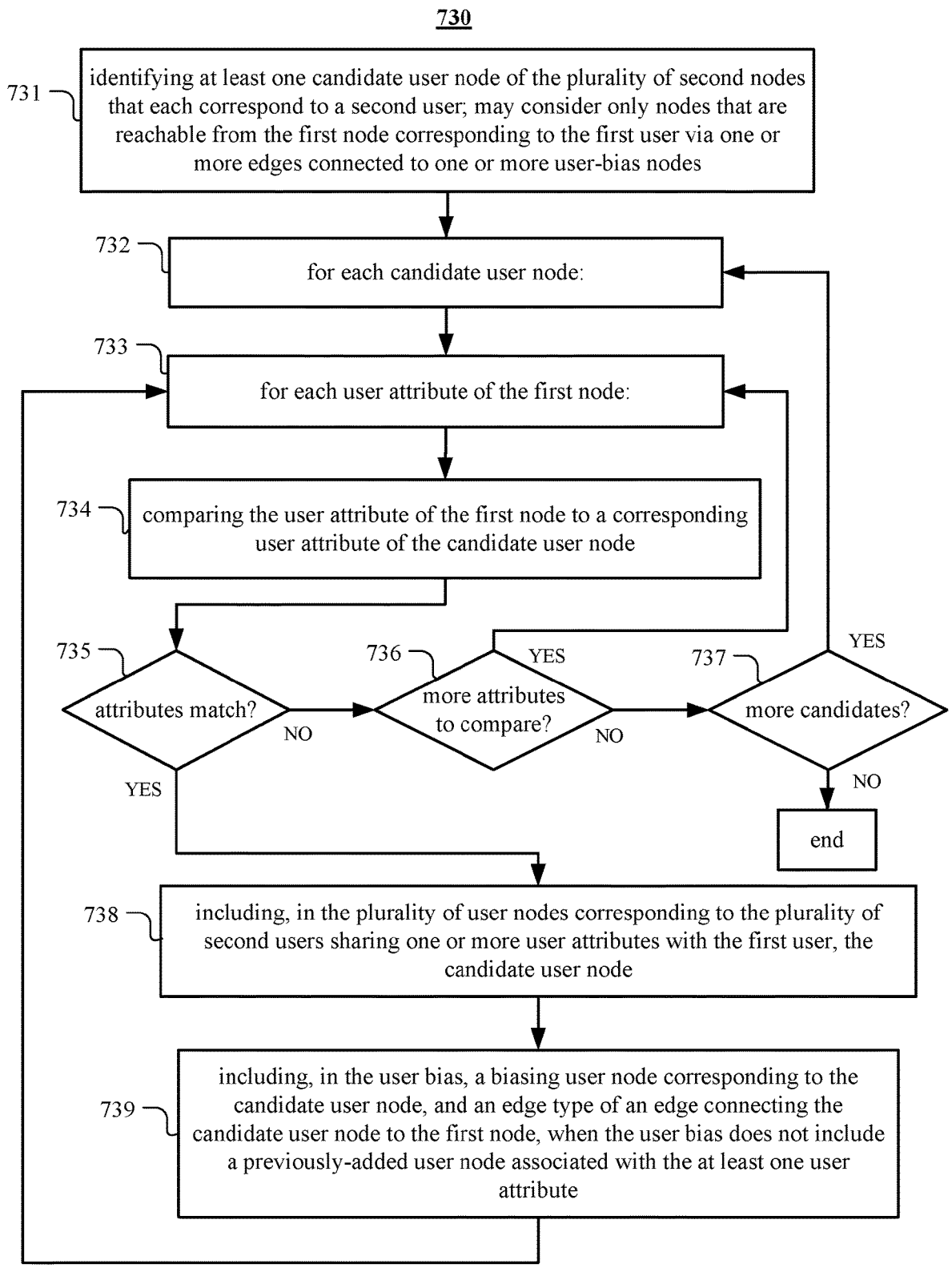
FIG. 7B illustrates, in a flowchart, a method for determining a user bias.

FIG. 7B illustrates, in a flowchart, a method for determining a user bias. This process, which may be invoked by block 730 of FIG. 7A, takes a querying user's node, identifies other users who share user attributes with the user, and identifies a user bias object 616 or 622 that can be used to check whether particular nodes, such as search results, are biased by the querying user's bias. Block 731 begins the process by identifying a "candidate" user node of the plurality of second nodes that each correspond to a second user. To speed up the search, the method may consider only nodes that are reachable from the first node corresponding to the first user via one or more edges connected to one or more user-bias nodes Block 732 indicates that the following blocks are performed for each candidate user node. Block 733 indicates that the following blocks are performed for each user attribute of each candidate user node. Accordingly, for each candidate user node, block 734 compares each user attribute of the first user's node to a corresponding user attribute of the candidate user node. If the attributes match, block 738 adds the candidate user node to the set of user nodes corresponding to the set of second users sharing one or more user attributes with the first user (i.e., the sub-population). The comparison is repeated for each attribute of each candidate user node. Block 739 generates the user bias object by adding a biasing user node corresponding to the candidate user node, and also adding an edge type (of an edge that connects the candidate user node to the first node) to the user bias when the user bias does not already include a previously-added user node associated with the at least one user attribute. That is, duplicate biasing user nodes are not added to the user bias object.

In particular embodiments, the term "user attribute" is used to refer to information associated with a node. A user attribute may be represented by a data field of a node, e.g., the name, education, and hometown fields. Alternatively, a user attribute of a node may be represented by another node and an edge that links the node to the other node, e.g., an "attends" edge linked to a node that represents a school, or a "friend" edge linked to another user.

In particular embodiments, the user bias that specifies the attributes of the biasing node, instead of specifying the biasing node itself, may be used in searches even after the social graph has been changed, e.g., by adding or removing user nodes. Specifying the user bias as a specific set of specific user nodes is also possible, but that set should be updated when users are added to or removed from the social graph.

FIG. 7C illustrates, in a flowchart, a method for identifying search results in a social graph. In particular embodiments, the process begins at block 741 by identifying a biased node that is connected to at least one of the set of user nodes corresponding to the plurality of second users by one or more edges. This identifying may be done by, for example, starting a search at one of the set of user nodes and following edges to other nodes. Alternatively, a search of the nodes in the social network can be performed starting at other nodes, and may search all nodes of a particular type, e.g., all concept nodes and/or all user nodes accessible by the querying user. Block 742 adds the identified biased node to the set of second nodes when the biased node satisfies the structured query. These blocks may be performed in the opposite order, e.g., by finding nodes that match the structured query, and then using the matching nodes as starting points for identifying biased nodes connected to the user nodes.

Figure 7D:
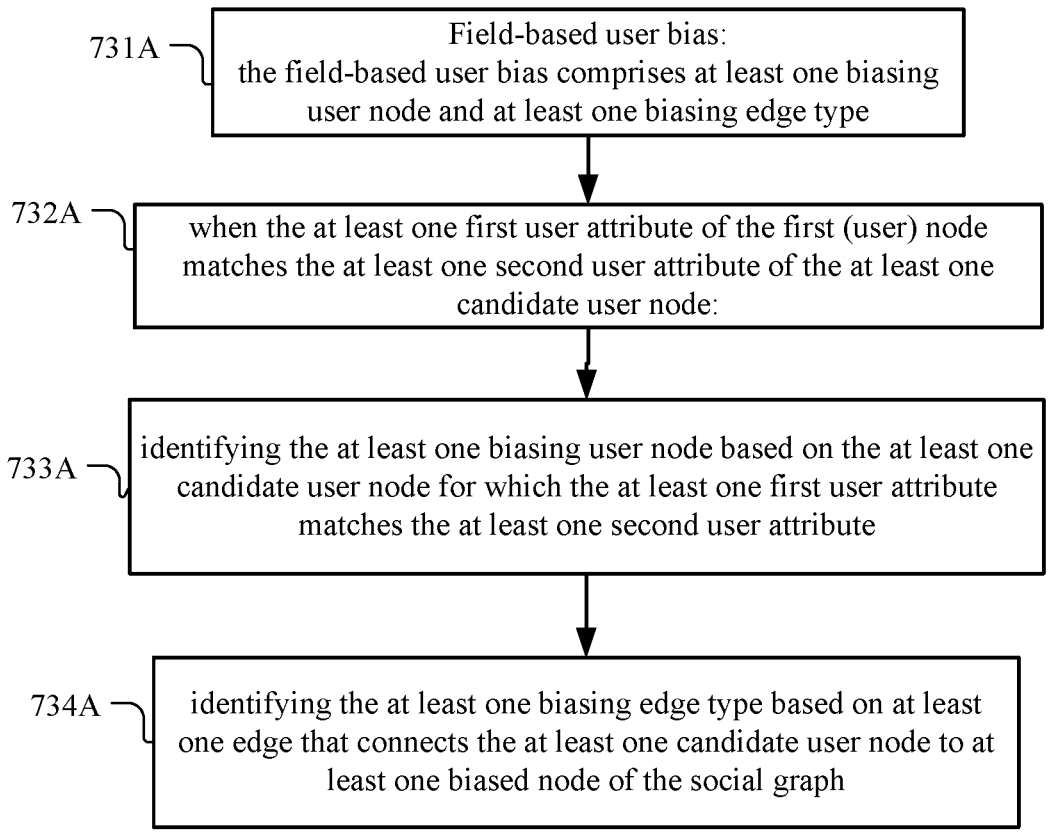
FIG. 7D illustrates, in a flowchart, additional details of the process for determining a user bias.

FIG. 7D illustrates, in a flowchart, additional details of the process for determining a field-based user bias, 222, which is a user bias represented by a biasing-edge type 206 and a user node 202 having a data-field attribute 626. The field-based user bias comprises at least one biasing user node and at least one biasing-edge type, as indicated at block 731A. When the user attribute of the first (user) node matches the user attribute of candidate user node at block 732A, block 733A identifies the biasing user node (of the field-based user bias) based on the candidate user node for which the user attribute of the first (user) node matches the user attribute of the candidate user node. Block 734A identifies the biasing-edge type of the user bias based on an edge that connects the candidate user node to a biased node of the social graph. The type of the connecting edge in the social graph may be used as the biasing-edge type of the user bias. The at least one biasing user node may be implemented as a copy of or a reference to the candidate user node for which the user attribute of the first (user) node matches the user attribute of the candidate user node.

Figure 7E:
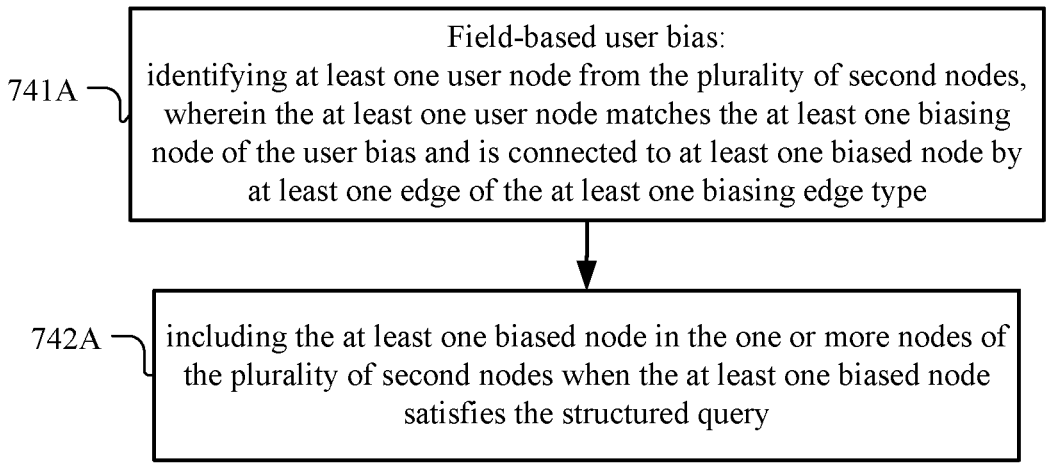
FIG. 7E illustrates, in a flowchart, additional details of the process for identifying search results in a social graph.

FIG. 7E illustrates, in a flowchart, additional details of the process for identifying search results in a social graph when the user bias is a field-based user bias 222. In particular embodiments, block 741A identifies a user node from the set of second nodes, such that the user node matches the biasing node of the user bias, and is connected a biased node by an edge of the biasing-edge type. Block 742A adds the biased node to the set of second nodes (which represent the search results) when the biased node satisfies the structured query.

Figure 7F:
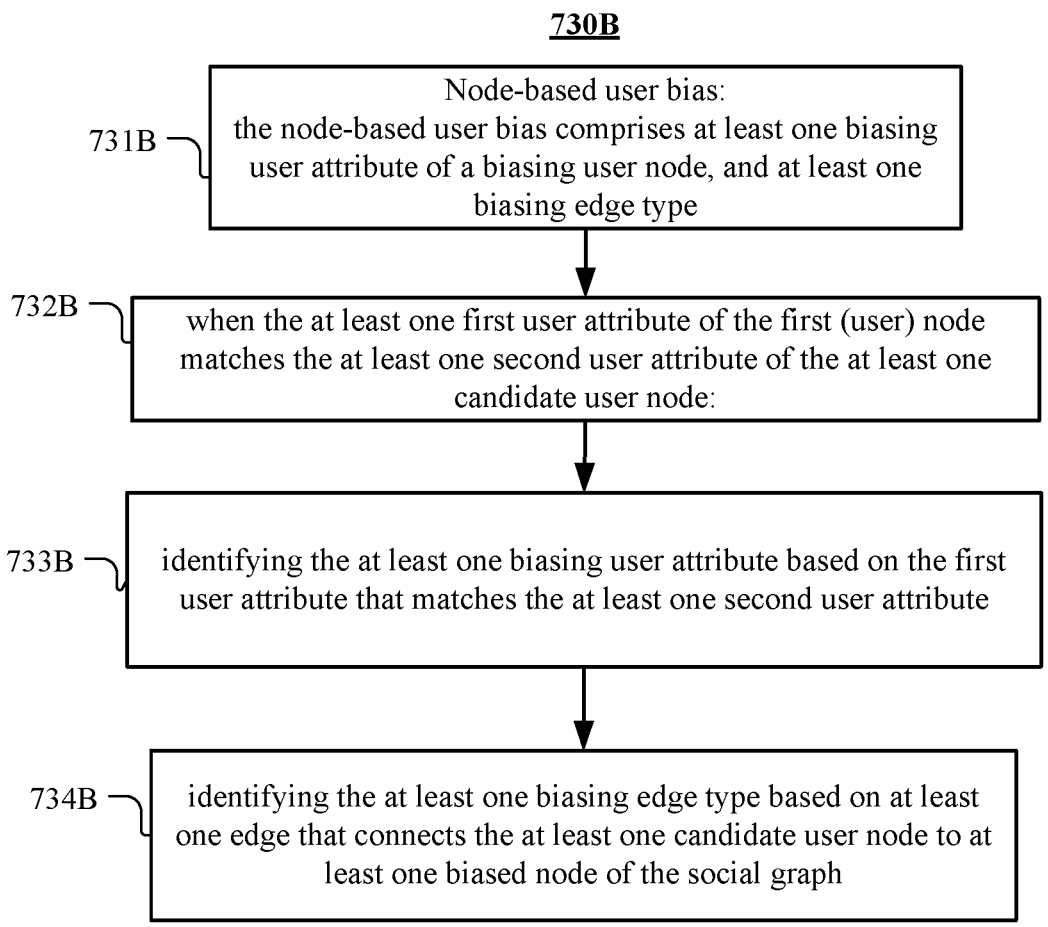
FIG. 7F illustrates, in a flowchart, additional details of the process for determining a user bias.

FIG. 7F illustrates, in a flowchart, additional details of the process for determining a node-based user bias 216, which is a user bias represented by a biasing-edge type 206 and a node 204 connected to an edge 206. In particular embodiments, the node-based user bias comprises at least one biasing user attribute of a biasing user node, and at least one biasing-edge type, as indicated at block 731B. When user attribute of the first (user) node matches the at user attribute of the candidate user node at block 732B, block 733B identifies the biasing user attribute (of the node-based user bias) based on the user attribute of the first (user) node that matches the user attribute of the candidate user node. Block 734B identifies the biasing-edge type of the user bias based on edge that connects the candidate user node to a biased node of the social graph. The type of the connecting edge in the social graph may be used as the biasing-edge type of the user bias.

Figure 7G:
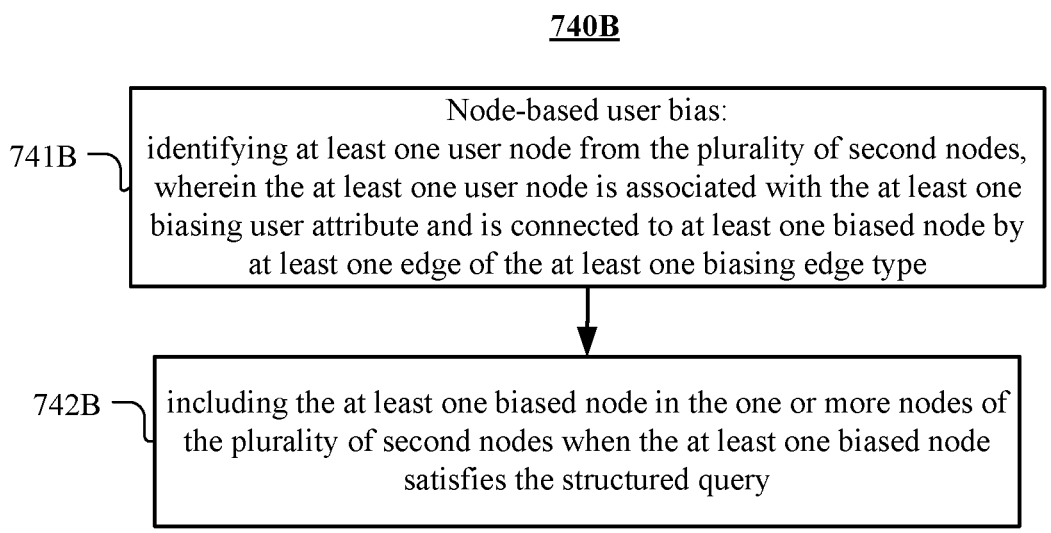
FIG. 7G illustrates, in a flowchart, additional details of the process for identifying search results in a social graph.

FIG. 7G illustrates, in a flowchart, additional details of the process for identifying search results in a social graph when the user bias is a node-based user bias 216. Block 741B identifies a user node from the set of second nodes, such that the user node is associated with the a biasing user attribute and is connected to a biased node by an edge of the biasing-edge type. Block 742B includes the biased node in the nodes of the set of second nodes (which represent the search results) when the biased node satisfies the structured query.

Particular embodiments may repeat one or more steps of the methods of FIGS. 7A-7G, where appropriate. Although this disclosure describes and illustrates particular steps of the methods of FIGS. 7A-7G as occurring in a particular order, this disclosure contemplates any suitable steps of the methods of FIGS. 7A-7G occurring in any suitable order. Moreover, although this disclosure describes and illustrates particular components, devices, or systems carrying out particular steps of the methods of FIGS. 7A-7G, this disclosure contemplates any suitable combination of any suitable components, devices, or systems carrying out any suitable steps of the methods of FIGS. 7A-7G. More information on generating search results may be found in U.S. patent application Ser. No. 13/731,939, filed 31 Dec. 2012, which is incorporated by reference.

Improving Search Results Based on User Biases

In particular embodiments, social-networking system 160 may score (or rank) the generated search results based at least in part on a user bias of the querying user. The user bias may indicate that the search results should be scored based on one or more factors, such as, for example, search counts or ratios, social-graph information, social-graph affinity, search history, other suitable factors, or any combination thereof. Search results may also be scored based on advertising sponsorship. Search results that match the bias may be ranked higher than other results. As an example and not by way of limitation, social-networking system 160 may determine that a particular user has a bias for traditional Chinese restaurants based on profile information indicating the user has lived in China, the types of check-ins the user has done (i.e., check-in-type edges 206 connecting the user node 202 of the querying user to particular concept nodes 204), and so on. When the user inputs a query for "Chinese restaurants in Palo Alto", social-networking system 160 may bias or boost the results to rank traditional Chinese restaurants over non-traditional Chinese restaurants (e.g., Asian fusion restaurants) based on the user's bias. As another example and not by way of limitation, if the querying user is interested in identifying other users that the querying user might be interested in dating (which may be determined, for example, because the querying user's profile information indicates he is recently single), the search results generated in response to a search query with a dating bias may rank the results such that users who indicate they are "single" are ranked higher than users who indicate they are "in a relationship". Similarly, if the querying user is interested in identifying users to network with in order to find a job (which may be determined, for example, because the querying user's profile indicates he recently moved to the area and has not listed an employer in his user profile), the search results generated in response to a search query with a networking bias may be ranked so that users who work at companies in the same geographic area as the querying user are ranked higher than users who work at geographically-distant companies.

In particular embodiments, the search results may be scored or ranked by a particular scoring/ranking algorithm implemented by the search engine. As an example and not by way of limitation, search results that are more relevant to the search query or to the user may be scored higher than results that are less relevant. Higher scores may correspond to higher rankings and greater degrees of relevance in search results. The way relevance is determined may be modified based on the user bias identified by social-networking system 160. In particular embodiments, social-networking system 160 may rank the one or more search results. Search results may be ranked, for example, based on the score determined for each of the search results. The most relevant result (e.g., highest/best scoring) may be ranked highest, with the remaining results having lower ranks commensurate with their score/relevance, such that the least-relevant result is ranked lowest. In particular embodiments, the relevance of a search result node to a query and/or the querying user may be based on the strength and/or degree of separation between the search result node and the user node(s). As an example and not by way of limitation, the strength of connections may be based on a number of edges connecting a search result node to user nodes. Degree of separation may be based on the number of nodes in a path from the search result node to a user node that corresponds to the querying user. Although this disclosure describes particular examples of user biases, this disclosure contemplates the use of any suitable information in a social graph as user biases. As an example and not by way of limitation, user biases may include or be based on concept nodes connected to the user's node, such as places, entities, resources, and so on, as described above, subject to appropriate privacy restrictions. Although this disclosure describes scoring search results based on user bias in a particular manner, this disclosure contemplates scoring search results based on user bias in any suitable manner.

In particular embodiments, social-networking system 160 may score the search results based on one or more user biases. Social-networking system 160 may score the search results using one or more scoring algorithms, where the search results may be scored based on their relevance to the search query. In some cases, a user may submit a search request for particular object-types, such as photos or users matching certain query constraints, but may desire more diversity in search results than simply the top N objects determined by a static ranking. Instead, the querying user may desire to see search results that reflect the user's user bias. The determination of relevance, and thus the scoring of the search results, may be modified or customized by the determined user bias for the query. Particular scoring algorithms may be used for particular user biases, and particular factors of a scoring algorithm may be weighted more or less for particular user biases.

As an example and not by way of limitation, continuing with a prior example, in response to the structured query "People who work as software engineers in Palo Alto", social-networking system 160 may determine that one of the user biases of the query is for networking. When scoring the identified user nodes 202 matching this query, social-networking system 160 may typically score based on social-graph affinity and score first-degree connections of the querying user better than more distant connections. However, if a user is querying for networking purposes, the user may not care about the degree-of-connection between the querying user and the identified user nodes 202. More useful for networking purposes may be to identify users who, for example, have more experience working as a software engineer, or users who are connected to other users who are also software engineers (particularly other software engineers who also live in Palo Alto). Therefore, when scoring the search results based on the networking user bias, social-networking system 160 may use a scoring algorithm that gives less weight to the user's distance in the social graph 200 and more weight to social-graph information related to the user's work history and relevant work-related connections. Although this disclosure describes scoring search results in a particular manner, this disclosure contemplates scoring search results in any suitable manner.

In particular embodiments, scoring the search results based on user bias may comprise scoring the search results based on a count or ratio of the objects of the search result that satisfy the query constraints of the search query. Based on the identified user biases for the search query, the count, the ratio, or any combination thereof may be used as a factor when scoring the search results. For particular query constraints, the constraint may be satisfied multiple times by a particular object. Although this disclosure describes scoring search results based on user bias in a particular manner, this disclosure contemplates scoring search results based on user bias in any suitable manner.

In particular embodiments, social-networking system 160 may score the search results based on a count of the objects of the search results that satisfy the query constraints of the search query. In certain cases, a particular object matching a query constraint may in fact have multiple attributes that satisfy the constraint. As an example and not by way of limitation, locations may have multiple check-ins by users, photos may have multiple users tagged in them, groups may have multiple users who are members, etc. In these types of cases, the count of how many times a particular query constraint is being satisfied may be considered when ranking the search results.

As an example and not by way of limitation, in response to a structured query for "Photos of my friends", social-networking system 160 may generate the query command (photos_of(users: <friends>)), and may determine that a user bias of this query is to view group photos the user's friends. However, this query command may be satisfied, for example, by a photo that has only one friend of the querying user tagged in it, or may be satisfied multiple times by a photo that has multiple friends tagged in it. Consequently, when scoring identified concept nodes 204 corresponding to photos with the user's friends tagged in the photo, social-networking system 160 may score photos better based on the number of the user's friends that are tagged in the photo. Thus, a photo that only has one friend tagged in it (such as, for example, a user's profile picture), may be scored worse than a photo that has several of the user's friends tagged in it.

As another example and not by way of limitation, in response to a structured query for "Photos of single women", social-networking system 160 may determine that a user bias of this query is to view individual photos of single women (i.e., photos where the only user in the photo is the single woman). However, this query command may be satisfied, for example, by a group photo of single women, or a photo having just one user tagged in it who is a single woman. Consequently, when scoring identified concept nodes 204 corresponding to photos with single women tagged in them, social-networking system 160 may score photos of single women standing alone better than photos of a group of single women (or photos of a single woman with one or more other users who are not single women). Furthermore, profile pictures of single women may be scored better than non-profile pictures of single women. Although this disclosure describes scoring search results based on search result counts in a particular manner, this disclosure contemplates scoring search results based on search result counts in any suitable manner.

In particular embodiments, social-networking system 160 may score the search results based on a ratio of the objects of the search result that satisfy the query constraints of the search query. As described previously, a particular object matching a query constraint may have multiple attributes that satisfy the constraint. But the same object may also have multiple attributes that do not satisfy the constraint. In these types of cases, the count of how many times a particular query constraint is being satisfied compared to how many time it is not being satisfied (i.e., a ratio) may be considered when ranking the search results.

As an example and not by way of limitation, in response to a structured query for "Photos of my family", social-networking system 160 may generate the query command (photos of(users: <family>)), and may determine that a user bias of this query is to view group photos showing the user's family and no one else. In other words, an ideal match would be a photo where the ratio of people tagged in the photo who satisfy the query constraint is as close to 1 as possible (i.e., only members of the user's family are tagged in the photo and no other users are tagged in the photos). However, this query command may be satisfied, for example, by a photo that has only one member of the user's family in it along with several other users, or a photo that has all members of the user's family and several other people tagged in it. Consequently, when scoring identified concept nodes 204 corresponding to photos with the user's family members tagged in the photo, social-networking system 160 may score photos better based on the ratio of users tagged in the photo that belong to the user's family (i.e., the concept node 204 corresponding to the photo is connected by tagged-in-type edges 206 to one or more user nodes 202 corresponding to users connected by family-type edges 206 to the querying user). Thus, a photo showing four of the user's family members posing with three other non-family members may be scored worse than a photo that only shows three of the user's family members (thus, a lower count) but where no other users are tagged in the photo (thus, a higher ratio). Although this disclosure describes scoring search results based on search result rations in a particular manner, this disclosure contemplates scoring search results based on search result rations in any suitable manner.

In particular embodiments, social-networking system may score the search results based on a count of objects of the search results that satisfy multiple query constraints of the search query. Where the search query has a plurality of query constraints, search results that include a single object that satisfies multiple query constraints may be undesirable. In certain cases, a particular object matching a query command with multiple query constraints may satisfy a plurality of the query constraints based on one or more attributes. In these types of cases, the count of how many objects/attributes are being used to satisfy these query constraints may be considered when ranking the search results. For certain queries, it is desirable to use different nodes or edges to satisfy each query constraint of a query command having a plurality of constrains.

As an example and not by way of limitation, in response to the structured query "Restaurants liked by Mark and men", social-networking system 160 may parse the structured query as a query command such as, for example, (intersect(locations: <restaurants>), (intersect(locations (liked by: <Mark>), locations(liked_by(user_gender: <male>))), and may determine that a user bias of this query is to identify restaurants liked by the user "Mark" and at least one other person who is also male. In this case, assume the user "Mark" is also a male. Social-networking system 160 may identify a first set of objects matching the first query constraint, which will be locations that are restaurants (i.e., concept nodes 204 corresponding to locations that are connected by location type edges 206 to a concept node 204 corresponding to "Restaurants"). Next, social-networking system 160 may intersect these results with a second set of objects identified as matching the second query constraint (which itself has multiple constraints), which will be locations liked by both the user "Mark" and by male users. However, since the user "Mark" is also male, locations liked by "Mark" may also be identified in this second set of objects. In this case, since a restaurant where only the user "Mark" likes it may be in both the first and second sets of objects, it is possible for social-networking system 160 to generate a search result corresponding to a location where the only user who likes it is the user "Mark" (or "Mark" and only female users). But the querying user is unlikely to want to view search results corresponding to only restaurants liked by "Mark" (in which case, the querying user could have simply searched for "Restaurants liked by Mark"). The user is more likely trying to find restaurants liked by at least two users—"Mark" and at least one other user who is male. Thus, social-networking system 160 may count whether one or two like-type edges 206 are being used to satisfy the query command (i.e., whether a like-type edge 206 connected to just "Mark" is being used, or if at least two different like-type edges 206 are being used: one from "Mark" and one from another user"). Thus, a restaurant where only a single like-type edge 206 is being used to satisfy both query constraints may be scored worse than a restaurant where two different like-type edges 206 are being used to satisfy the constraints. Although this disclosure describes scoring search results based on query constraints bias in a particular manner, this disclosure contemplates scoring search results based on query constraints in any suitable manner.

In particular embodiments, social-networking system 160 may score the search results based on a social-graph affinity associated with the querying user (or the user node 202 of the querying user). Social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action.

In particular embodiments, social-graph affinity may be used as a factor when scoring search results. As an example and not by way of limitation, in response to the structured query "Photos of my friends", social-networking system 160 may generate the query command (photos_of(users: <friends>)), and may determine that the user bias of this query is to view group photos showing the user's friends. When scoring identified concept nodes 204 corresponding to photos with the user's friends tagged in the photo, social-networking system 160 may score photos better based on the querying user's respective social-graph affinity (e.g., as measured by a affinity coefficient) of the user's tagged in the photo with respect to the querying user. Furthermore, photos showing more of the querying user's friends may be tagged higher than photos showing fewer of the user's friends, since having more friends tagged in the photo may increase the querying user's affinity with respect to that particular photo. Although this disclosure describes scoring search results based on affinity in a particular manner, this disclosure contemplates scoring search results based on affinity in any suitable manner. Furthermore, in connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632, 869, field 1 Oct. 2012, each of which is incorporated by reference.

In particular embodiments, scoring the search results based on user bias may comprise scoring the search results based on social-graph information, such as, for example, the degree of separation in the social graph 200, node-type and edge-type information, social-graph affinity, other suitable social-graph information, or any combination thereof. As an example and not by way of limitation, in response to the structured query "Single women in Palo Alto", social-networking system 160 may determine that one of the user biases of the query is for dating. When scoring the identified user nodes 202 matching this query, social-networking system 160 may score based on social-graph affinity and score first-degree connections of the querying user better than more distant connections. However, if a user is querying for dating purposes, the user may be unlikely to want to view first-degree connections (i.e., the user's friends). More useful for dating purposes may be to identify second-degree connections (i.e., friends-of-friends) who are single women. Thus, when scoring the search results based on the dating user bias, social-networking system 160 may use a scoring algorithm that scores second-degree connections better than first-degree connections. As another example and not by way of limitation, continuing with the prior example, when scoring the identified user nodes 202 matching the structured query "Single women in Palo Alto", social-networking system 160 may score users better based on the number of "likes" the profile picture of the user has, where users with popular profile pictures (i.e., the concept node 204 corresponding to the profile picture is connected to many user nodes 202 by like-type edges 206) may be considered more attractive candidates for dating. Although this disclosure describes scoring search results based on social-graph information in a particular manner, this disclosure contemplates scoring search results based on social-graph information in any suitable manner.

In particular embodiments, social-networking system 160 may send one or more search results to the querying user. The search results may be sent to the user, for example, in the form of a list of links on the search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. Social-networking system 160 may then send the search-results webpage to the web browser 132 on the user's client system 130. The user may then click on the URL links or otherwise select the content from the search-results webpage to access the content from social-networking system 160 or from an external system (such as, for example, third-party system 170), as appropriate. In particular embodiments, each search result may include link to a profile page and a description or summary of the profile page (or the node corresponding to that page). The search results may be presented and sent to the querying user as a search-results page. When generating the search results, social-networking system 160 may generate one or more snippets for each search result, where the snippets are contextual information about the target of the search result (i.e., contextual information about the social-graph entity, profile page, or other content corresponding to the particular search result).

In particular embodiments, social-networking system 160 may only send search results having a score/rank over a particular threshold score/rank. As an example and not by way of limitation, social-networking system 160 may only send the top ten results back to the querying user in response to a particular search query. Although this disclosure describes sending particular search results in a particular manner, this disclosure contemplates sending any suitable search results in any suitable manner.

Figure 8:
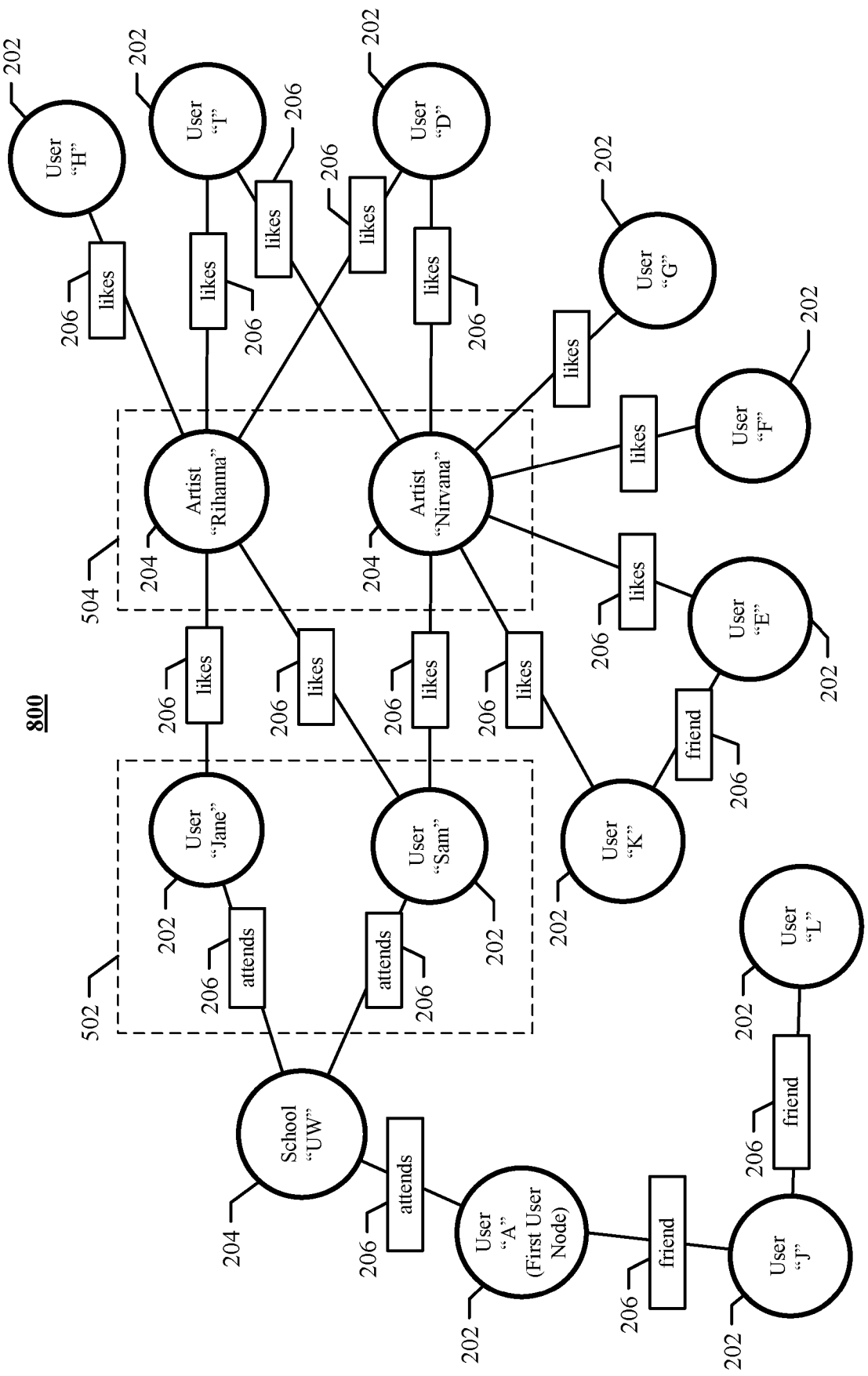
FIG. 8 illustrates searching based on user attributes using TF-IDF in a social graph.

FIG. 8 illustrates searching using probabilistic Term Frequency-Inverse Document Frequency (TF-IDF) techniques based on user attributes in a social graph. In particular embodiments, probabilistic TF-IDF techniques may be used to refine search results based on user sub-populations. In particular embodiments, if a population such as a subset of social network users is specified in the query received from the user, then results of the query that are liked or otherwise connected to users in the group at a greater proportion than are other users may be ranked higher in search results than results that are connected to the other users. The search results may be biased based on the query. For example, the query "musicians liked by UW students" identifies a population, UW students. The population of UW students is relatively large, and UW students are likely to like many different musicians, so the query "liked by UW students" is less likely to produce results that are relevant to the user. This type of bias is referred to herein as an "explicit" bias, because the bias may be based on information specified explicitly in the search query. The explicit techniques based on the query, and the implicit techniques based on user information, as described elsewhere herein, may be used separately or in combination.

In particular embodiments, a user who wants to find musicians may specify the query "musicians," which may return a large number of musicians, many of whom may not be of interest to the user. The user may supply a more specific query, or the query can be automatically made more specific to improve its usefulness to the user. For example, adding the condition "liked by UW students" results in the query "musicians liked by UW students", which is more likely to return results of interest to the user. The query may include a condition supplied by the user, such as "liked by UW students", that identifies a population. In other embodiments, a condition may be added to the query specified by the user based on user information associated with the user, as described herein. For example, the user may provide the query "musicians" in an attempt to find musicians. The condition "liked by UW students" may be generated automatically, e.g. by determining that the child is a UW student. The condition may then be added to the user-supplied query. In particular embodiments, if the user information associated with the user indicates that the user is a member of a sub-population, such as a student at the University of Washington ("UW"), the query can be refined automatically to select musicians who are liked by other members of the sub-population, e.g., other UW students. However, that refined query may still return a large number of musicians. As an example and not by way of limitation, there are many UW students who like many musicians, and not all of the musicians are likely to be of interest to the user. In one aspect, TDF-IF techniques may be used to identify musicians that are likely to be of interest to the user by determining whether the members of the sub-population like particular musicians at a disproportionately higher rate than do members of the overall population.

In particular embodiments, a probabilistic TF-IDF technique may determine how many members of the sub-population are expected to like an entity based on the number of people in the overall population who like the entity. The expected proportion may then be compared to the proportion of members in the sub-population who actually do like the entity. Entities liked disproportionately more by users in the querying user's sub-population may then be boosted in the search results. Although the likes-type relation is used in this example, other types of relations may also be used, e.g., a checked-in-type relation, a friends-type relation, or any other type of relation that associates users. Further, although this disclosure describes refining search results using probabilistic TF-IDF techniques in a particular manner, this disclosure contemplates using any suitable probabilistic TF-IDF techniques in any suitable manner.

As an example, and not by way of limitation, suppose a sub-population of 500 students is selected from a total social-network population of approximately 1 billion people. If a musician has 10 million fans, and there are 1 billion users of the social networking system 160, then 1/100 of the users of the social-networking system 160 can be expected to like the musician. At that rate, out of a sub-population of 500 students, 5 can be expected to like the musician. If the number of students who like the musician is actually 10, then the sub-population is relatively biased toward the musician. If the number of students who like the musician is 1, then the sub-population is now biased toward that musician. Therefore, query results may be refined or filtered further using probabilistic TF-IDF techniques to identify and boost the rankings of musicians that are liked disproportionately more by users in the querying user's sub-population, e.g., UW students, than by the overall population of users.

FIG. 8 shows a query of a social graph 800. As an example, and not by way of limitation, user A 202 submits a query for "musicians" and the users Jane and Sam 202 are students at the same university, UW 204, as user A 202. Jane and Sam like the artists Rihanna and Nirvana 204, so the search results are biased toward those artists. However, the refined query may still return a large number of musicians, particularly for real-world social graphs. As an example and not by way of limitation, there are many students at the University of Washington who like many musicians, and not all of the musicians are likely to be of interest to the user. As an example and not by way of limitation, probabilistic TF-IDF may be used to identify musicians whom are liked disproportionately more by users in the querying user's sub-population, e.g., UW students, than by the overall population of users. The musicians liked disproportionately more by other users in the querying user's sub-population are more likely to be the musicians the user is looking for.

As an example and not by way of limitation, social-networking system 160 may access the forward index of each search result and determine what percentage of the users in the sub-population checked-in (or are otherwise related to) the entity associated with each search result compared to the percentage of the overall population of users who checked-in at (or are otherwise connected to) the entity associated with the search result. The ratio of the two percentages may be used as a feature value to rank the search results in a machine-learning model. The query results may be refined or filtered further using probabilistic TF-IDF techniques.

As an example, and not by way of limitation, in FIG. 8, there are 12 users in an overall population, including users A, Jane, and Sam. Rihanna is liked by two users in user A's sub-population 502 (Jane and Sam) and by 5 users in the overall population (including Jane and Sam). Rihanna is liked by 2 out of 2=100% of users in the sub-population. Rihanna is liked by 5 out of 12=42% of users in the overall population. Since Rihanna is liked disproportionately more by A's sub-population than by the overall population (100%>42%), user A's search results should be biased toward Rihanna (e.g., Rihanna should be boosted A's search results). Nirvana is liked by one user in A's sub-population 502 (Sam) and by 5 users in the overall population (including Sam). Nirvana is liked by 1 out of 2=50% of users in the sub-population. Nirvana is liked by 7 out of 12=58% of users in the overall population. Since Nirvana is liked disproportionately less by users in A's sub-population than by the overall population (50%<58%), Nirvana should not be biased or boosted in A's search results.

A dampening technique may be used to reduce noise and the influence of entities that are liked by very few people. In practice, each population is slightly biased toward any of the musicians that are retrieved, because only musicians that some random subset of students like are being considered. A goal, however, is to find the students that are most biased. If there's a musician with a small number of fans, e.g., 5 fans, and one of those fans is a UW student who is included in the score, then that one student may cause UW students to appear to be strongly biased towards that musician. However, in this example, the number of data points is relatively small, so the student should not be used in the calculation. As an example and not by way of limitation, there may be another musician who has millions of fans, and is liked by a significant population of UW students that make up a smaller percentage of the total population than 1 out of 5. Therefore, the musician liked by 1 out of 5 fans should not be placed above the musician that has millions of fans and is liked by a significant number of the population. To dampen the influence of the musician liked by a large proportion of a small population, a number, e.g., 5, is subtracted from the number of people. As an example and not by way of limitation, if 5 people out of 500 people like a musician, and the dampening number is 5, then subtracting the dampening number results in 5−5=0 people liking the musician. A score of 0 is not used. On the other hand, if 30 of 500 people like a musician, subtracting 5 results in 25 of 500 people, which is still a significant number, and the results are biased significantly toward that musician. Subtracting a number in this way is referred to herein as dampening. The results should not be biased towards highly unpopular musicians, but should be biased towards slightly more popular musicians. That is, the results should be biased towards slightly niche pages, but not towards overly-niche pages.

In particular embodiments, dampening may be used to remove random noise. If a musician has millions of likes, there can be noise in a sample of 500 people, in which the number of people that like the musician is slightly more or slightly less than the expected number because of errors in the data or other. Dampening can remove the noise and smooth out the side where the data erroneously contains slightly more likes than expected.

In particular embodiments, the search for "musicians liked by UW students" can be processed using probabilistic TF-IDF as follows. Queries are generated to retrieve musicians and UW students from the social graph and related databases. In a social network, "musicians" may be represented as a category of pages on the online social network. Therefore, a query for "musicians" can be generated using a query for musician pages. Since UW students are users, a query for UW students may be executed by a "users" database to return a number of UW students. The generated query performs an "and" between musicians and any of the UW students, i.e., an "and" between musicians and an "or" of UW students. The query generates a set of page documents that represent musicians. The number of UW students (from the sample) who like each document (e.g., musician page) is determined, e.g., 15 students. The total number of users who like each document is determined, e.g., 5 million users, as is the total number of social network users, e.g., 1 billion users. If 5 million out of 1 billion users like the musician, then the overall population likes the musician at a rate of 0.5%. Suppose the total number of users who are UW students is 500, and 15 of them like the musician. Therefore the sub-population likes the musician at a rate of 3%. If the ratio between those two rates, e.g., the sub-population rate divided by the overall population rate, is greater than 1, then the sample is biased in favor of the musician. If the ratio is less than 1, then the sample is biased against the musician. Since 3%/0.5% (or (15/500)/(5 million/1 billion)) is >1, the sample is biased in favor of the musician.

In particular embodiments, by applying dampening, the number of people in the sub-population (UW students) who like the musician is reduced by the dampening factor. If the dampening factors is 5, the number of students who like the musician is reduced to 15−5=10. Therefore, the dampened ratio is (10/500)/(5 million/1 billion)=2%/0.5%, which is still greater than 1 and therefore biased in favor of the musician. The dampening factor may be a constant, or a percentage of the total number of users in the sub-population. As an example and not by way of limitation, if the dampening factor is one percent of the total number of users in the sub-population, then for 500 people, the dampening factor may be 5 for a sub-population of 500 users, or 10 for a sub-population of 1000 users.

Figure 9A:
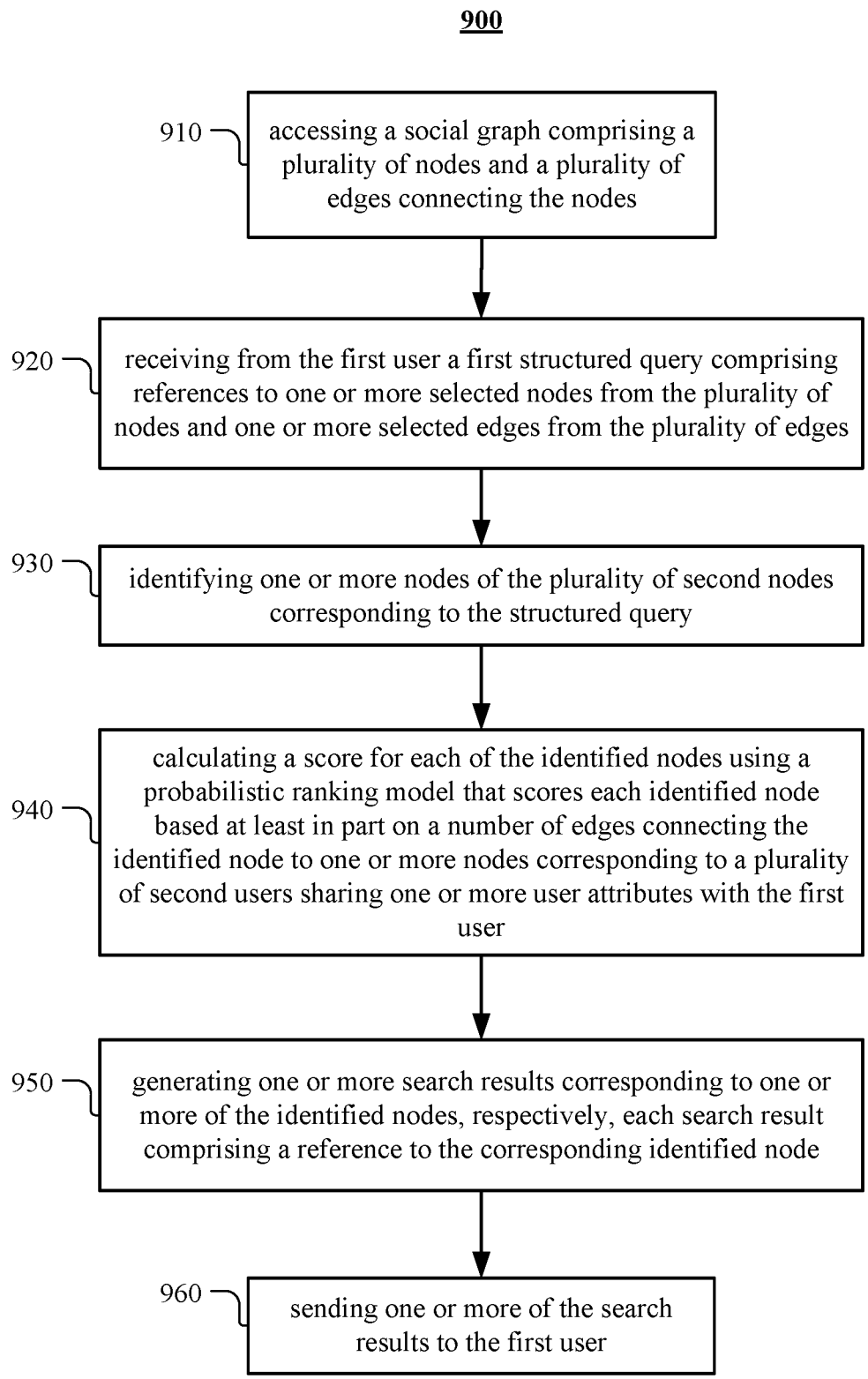
FIG. 9A illustrates, in a flowchart, a method for generating search results based on scores calculated for nodes by a probabilistic TF-IDF ranking model.

FIG. 9A illustrates, in a flowchart, a method for generating search results based on scores calculated for nodes by a probabilistic TF-IDF ranking model. In particular embodiments, the method of FIG. 9A starts at block 910 by establishing that a social graph has nodes and edges connecting the nodes, the nodes include a first node corresponding to a first user (the querying user), and a set of second nodes that each correspond to a concept or a second user. The set of second nodes can be thought of as containing all nodes in the social graph. Block 920 receives, from the user, a structured query that references nodes and edges of the social graph. Block 930 identifies one or more nodes of the set of second nodes corresponding to the structured query. Block 940 calculates a score for each of the identified nodes using a probabilistic TF-IDF ranking model that scores each identified node based on a number of edges connecting the identified node to one or more nodes corresponding to a set of second users sharing one or more user attributes with the first user. The set of second users corresponds to the sub-population 502. Block 950 generates search results corresponding to the identified nodes. Each search result includes a reference to the corresponding identified node. Block 960 sends the search results to the first user. The score calculated for each of the identified nodes biases the search results toward nodes connected to disproportionately more nodes in the first set of user nodes than nodes in the plurality of second nodes that correspond to the overall population of users. Biasing the search results toward nodes connected to disproportionately more nodes in the first set of user nodes ranks the nodes connected to disproportionately more nodes higher than the nodes in the plurality of second nodes that correspond to the overall population of users.

The method of FIG. 9A may also dampen the calculated scores for each of the identified nodes by subtracting a dampening value from the score of each of the identified nodes. The dampening value may be a percentage of the total number of user nodes in the first set of user nodes.

The method of FIG. 9A may also identify the set of second users by comparing user attributes of the first user with user attributes of each second user of the overall population of users, and include in the plurality of second users each second user having a user attribute that matches a user attribute of the first (querying) user. The user attributes may include user age, sex, gender, ethnicity, religion, current location, town lived in, home town, likes, friends, school attended, game played, music listened to, video watched, organization and/or worked at. The user attributes may include one or more attribute data fields associated with the user (querying) node. The user attributes may include an attribute edge of an attribute edge type and an attribute node of an attribute node type, such that the attribute node is connected to the user node by the attribute edge.

The method of FIG. 9A may further determine a sub-population proportion based on the number of user nodes in the first set of user nodes that are connected to the particular node by the particular type of edge, and determine an overall population proportion based on the number of user nodes corresponding to the overall population that are connected to the particular node by the particular type of edge. The user nodes corresponding to the set of second users may be connected to the particular node by the particular type of edge in greater proportion than are user nodes corresponding to an overall population of users when the sub-population proportion is greater than the overall population proportion.

Figure 9B:
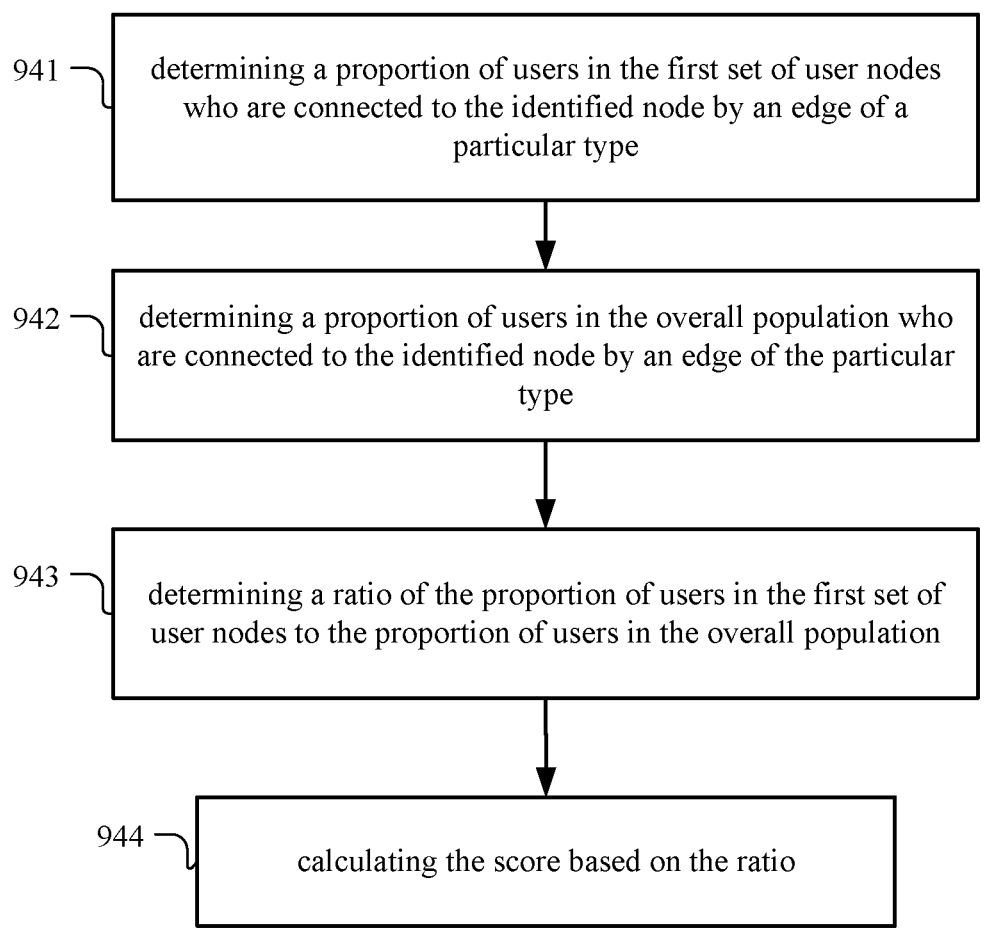
FIG. 9B illustrates, in a flowchart, a method for calculating scores for nodes based on a probabilistic TF-IDF ranking model.

FIG. 9B illustrates, in a flowchart, a method for calculating scores for nodes based on a probabilistic TF-IDF ranking model. In particular embodiments, the method of FIG. 9B begins at block 941 by determining a proportion of users in the set of user nodes who are connected to the identified node by an edge of a particular type. Block 942 determines a proportion of users in the overall population who are connected to the identified node by an edge of the particular type. Block 943 determines a ratio of the proportion of users in the first set of user nodes to the proportion of users in the overall population, and block 944 calculates the score based on the ratio. The score may be calculated using a machine-learning model, for example.

Figure 10:
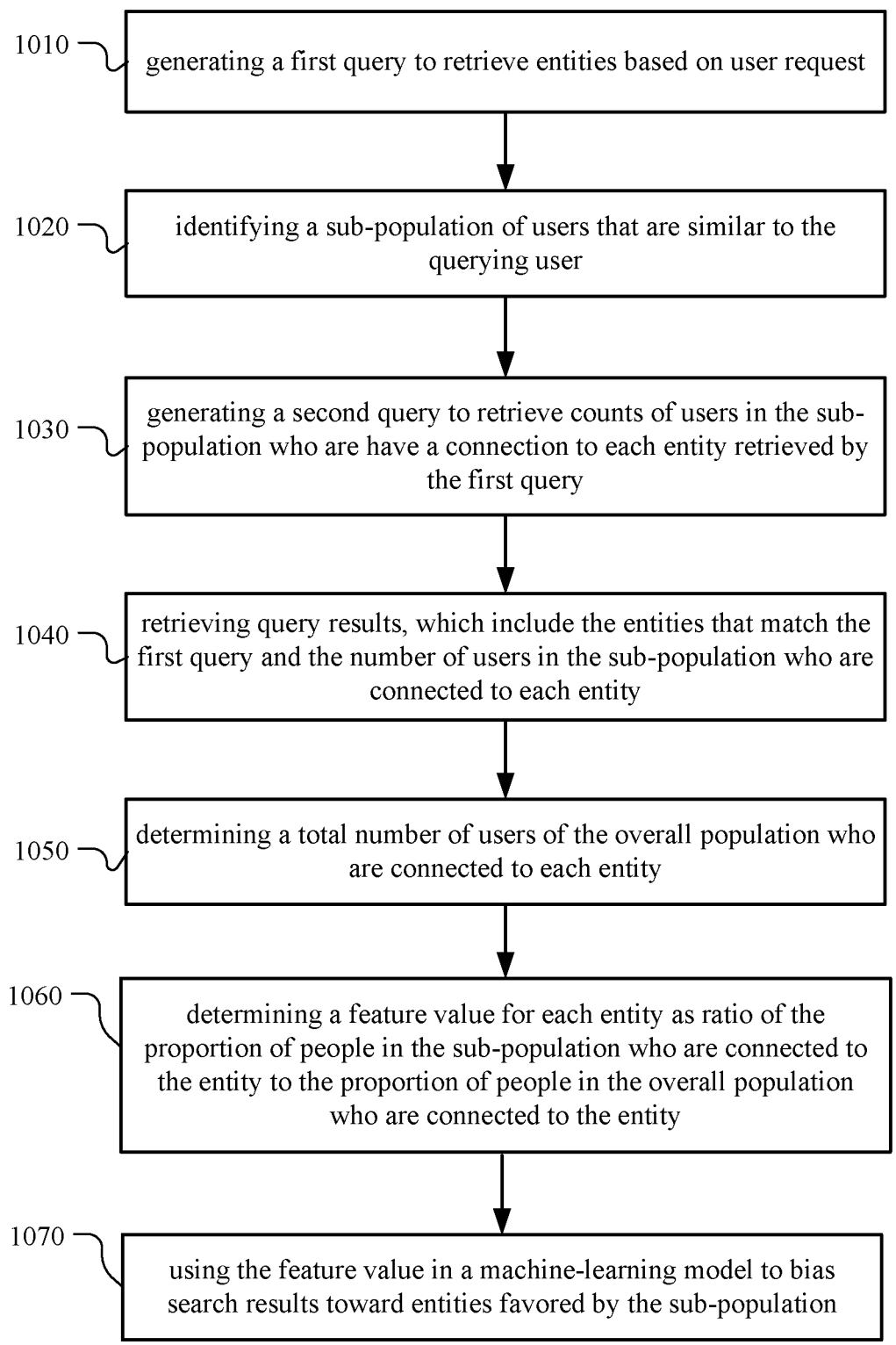
FIG. 10 illustrates, in a flowchart, a method for searching using probabilistic TF-IDF techniques in a social network.

FIG. 10 illustrates, in a flowchart, a method for searching using probabilistic TF-IDF techniques in a social network. As an example and not by way of limitation, suppose that a user queries the social graph for Chinese restaurants. As an example, and not by way of limitation, the user's user information indicates that the user is from China, Taiwan, or other nearby region, which may indicate that they like traditional Chinese restaurants, non-traditional Chinese restaurants, or neither (because there is insufficient information, in which case no query refinement is performed). The user lives in the city of Menlo Park, Calif., but does not include the city in the search query. The method may select a random population of users from China in the querying user's area, determine the rate at which people in the overall population go to Chinese restaurants and the rate at which the selected population goes to Chinese restaurants, and determine whether going to Chinese restaurants is biased in favor of or against the selected population.

In particular embodiments, the process of FIG. 10 begins at block 1010 by generating a first query to retrieve entities based on user request. In this example, a query is generated to retrieve, in areas that are near Menlo Park, places that are tagged with the topic "Chinese restaurant." The process biases the results of the query towards entities favored by users that are similar to the querying user. Block 1020 identifies a sub-population of users that are similar to the querying user in the sense that the sub-population users share one or more user attributes (e.g., demographic attributes) with the querying user. Block 1020 may select a random population of users from China in the querying user's geographical area (Menlo Park). To identify the users in the sub-population, a strong-or (SOR) query may be used to retrieve people who are from China and have also been to restaurants in areas near Menlo Park. Block 1030 generates a second query to retrieve counts of users in the sub-population who are have a connection to each entity retrieved by the first query. As an example and not by way of limitation, use an inner query to the users database. The querying user has a relatively high weight, but the other users are optional (i.e., have zero weight). The query finds users who presumably have more traditional taste, and SORs those in with an optional weight of zero.

In particular embodiments, block 1040 retrieves query results, which include the entities that match the first query and the number of users in the sub-population who are connected to each entity. The restaurants are found. Block 1050 determines a total number of users of the overall population who are connected to each entity. The query results indicate the number of people in the sub-population who went to each of the places in the results. That is, for each place retrieved, the query results indicate how many of the users with traditional taste went to that place (if any).

In particular embodiments, the number of people in the sub-population who have checked in at the place corresponds to the TF-IDF sample frequency f[s]. The total number of people in the sub-population corresponds to |S| (e.g., the number of people in the sample). A forward index for places may be used to determine the total number of people that have checked in at each retrieved place. The total number of people in the overall population who have checked in at the place corresponds to the "document" frequency f[d]. The total number of people in the overall population corresponds to |U| (e.g., the number of users of the social network).

In particular embodiments, block 1060 determines a feature value for each entity that matches the query as a ratio of the proportion of people in the sub-population who are connected to the entity to the proportion of people in the overall population who are connected to the entity. Block 1070 uses the feature value in a machine-learning model to bias search results toward entities favored by the sub-population. The feature value may be used in the machine-learning model to bias search results toward restaurants that are favored, e.g., liked or visited, by people in the sub-population. As an example and not by way of limitation, if there are a total of |S|=500 users in the sub-population, and f[s]=10 checked in, the ratio can be used to determine if the number of users that checked in is a relatively (i.e., proportionally) high number or low number compared to the total number of users f[d] in the overall population (of total size |U|) who have been to the restaurant. The higher the number with respect to the total number of check-ins for a place, the higher the value of one particular feature that corresponds to that place. The feature may be used in a machine-learning model, and is biased favorably for users in the sub-population. Therefore, the final query is biased towards Chinese restaurants that are more traditional, e.g., favored by users in the sub-population. In this example, the feature is proportional to the ratio of people in the population to people who went to the restaurant.

In particular embodiments, probabilistic TF-IDF-based techniques may be used to generate scores for documents or search results as follows. A basic IDF function is:

$$IDF = f[s] \cdot \log\left(\frac{|U|}{f[d]}\right)$$

where f[s] is the frequency of hits in the sample, U is a set of users, |U| is the number of users, f[d] is the frequency of hits in the document, e.g., the number of likes, check-ins, students, and so on. S is the sample, and D is the document being scored In one aspect, the basic IDF function may be dominated by f[s], which implicitly favors documents with high like counts, since such documents ordinarily receive more hits in a given sample. A probabilistic approach represents hits (e.g. items in f[s]) as a random set of users with respect to D. Then the expectation E(f[d]) may be expressed as:

$$E(f[d]) = f[s] \cdot \frac{|U|}{|S|}$$

The ratio of the expectation frequency of hits in the document to the actual number of hits in the document is:

$$\text{ratio} = \frac{E(f[d])}{f[d]}$$

If the ratio is greater than 1, it suggests the assumption was wrong, and D and f[s] are actually correlated (and thus D and the target set of documents may be correlated). If the ratio equals 1, the assumption seems correct, and so this document is not unusual. If the ratio is less than 1, D is probably negatively correlated with f[s]. The degree to which the ratio is greater than 1 is the extent to which the document is correlated with the set of users. To make this a scoring feature, normalize to:

$$\text{feature} = \log\left(1 + \frac{E(f[d])}{f[d]}\right)$$
$$= \log\left(1 + \frac{(f[s] \cdot |U|)}{|S| \cdot f[d]}\right)$$

The minimum expected feature value may be approximated as:

$$\min(\text{feature}) = \log\left(1 + \frac{1 \cdot 1 \cdot 10^9}{|5000| \cdot 1 \cdot 10^8}\right) \cong 0.$$

The maximum expected value may be approximated as:

$$\max(\text{feature}) = \log\left(1 + \frac{1 \cdot 10^9}{1}\right) \cong 9.$$

The feature value may be scaled to the range 0 . . . 100 by multiplying the result by, for example, 11, or other number based on the maximum expected value. The ratio of sub-population proportion to overall population proportion is:

$$\text{ratio} = \frac{E(f[d])}{f[d]}, \text{ where } E(f[d]) = f[s] \cdot \frac{|U|}{|S|}$$
$$= \frac{f[s] \cdot \frac{|U|}{|S|}}{f[d]}$$
$$= \frac{\frac{f[s]}{|S|}}{\frac{f[d]}{|U|}}.$$

This ratio formula may be used to determine the feature value as a ratio of proportions, as described above.

In particular embodiments, the probabilistic and sample approaches are often biased towards unpopular pages, because even a single like out of a sample of 500 (which may happen by chance), for a page with only a few thousand likes, dominates 200 likes out of 500 (a high number) for a page with 10 million likes. The following approaches may reduce this bias toward unpopular pages: Combination with another score (one biased towards more popular pages), scaling by multiplying the feature value by a scale factor, and dampening, which can also be used to account for accidental noise. When sample sizes are low compared to the total number of likes/check-ins/etc. with a page (e.g., approximately 500 compared to several hundred thousand or million), noise can pull relatively unpopular pages to the top of the ranking (e.g., 1 hit for a page with 1000 likes dominates 10 hits for a page with millions of likes).

Particular embodiments may repeat one or more steps of the methods of FIGS. 9A, 9B, and/or 10, where appropriate. Although this disclosure describes and illustrates particular steps of the methods of FIGS. 9A, 9B, and 10 as occurring in a particular order, this disclosure contemplates any suitable steps of the methods of FIG. 9A, 9B, or 10 occurring in any suitable order. Moreover, although this disclosure describes and illustrates particular components, devices, or systems carrying out particular steps of the methods of FIGS. 9A, 9B, and 10, this disclosure contemplates any suitable combination of any suitable components, devices, or systems carrying out any suitable steps of the methods of FIGS. 9A, 9B, and 10.

Systems and Methods

Figure 11:
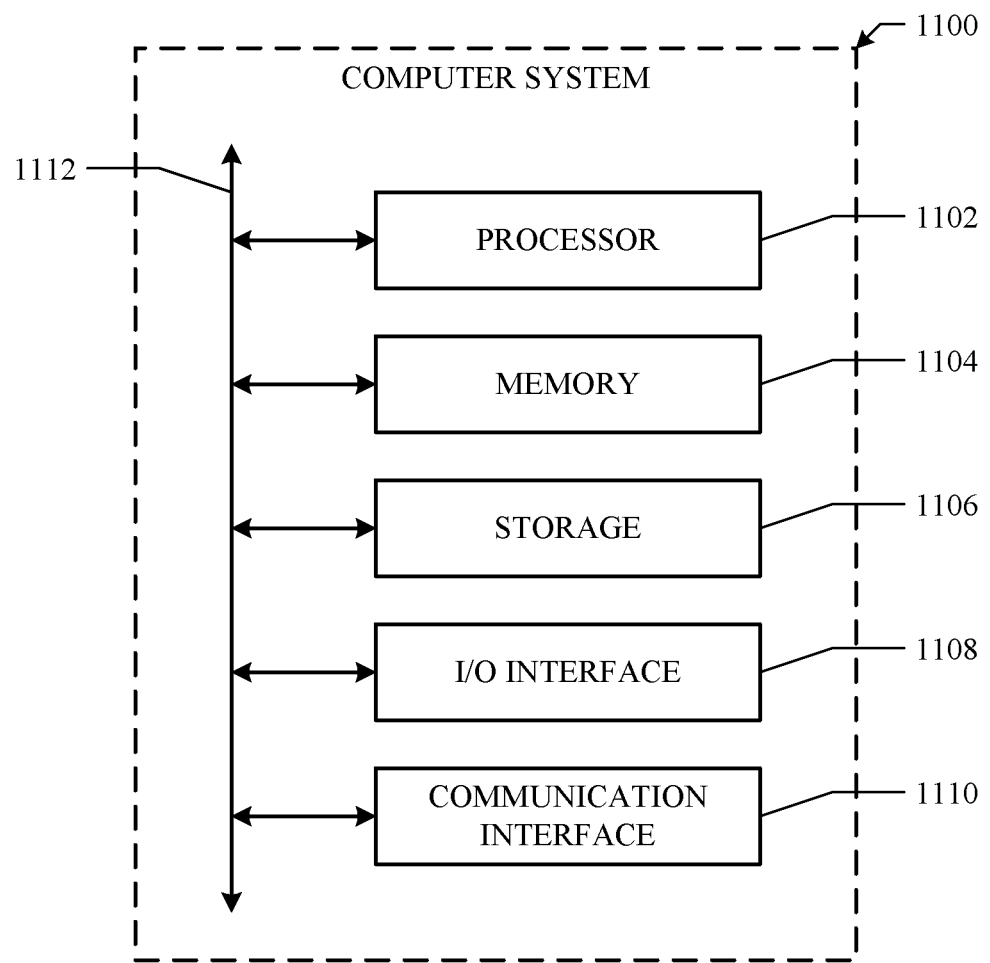
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems associated with an online social network:
   receiving, at the one or more computing systems from a client system associated with a first user of the online social network, a query input comprising a character string;
   parsing, by the one or more computing systems, the query input to identify one or more n-grams;
   determining, by the one or more computing systems, a search bias of the first user with respect to the query input, the search bias being determined based on an explicit bias and an implicit bias of the first user, wherein the explicit bias is based on an analysis of the entities associated with the online social networking matching n-grams in the query input, and wherein the implicit bias is based on an analysis of user-profile information of a plurality of second users sharing one or more user attributes with the first user;
   identifying, by the one or more computing systems, one or more content objects matching the query input, wherein the one or more content objects are identified based at least in part on the search bias of the first user; and
   sending, from by the one or more computing systems to the client system, responsive to the query input, instructions for presenting a search-results interface, wherein the search-results interface comprises references to one or more of the identified content objects.

2. The method of claim 1, further comprising:
   generating a query command in response to receiving the query input, wherein:
   the query command comprises one or more query constraints; and
   the explicit bias of the first user is determined based at least in part on one or more query constraints of the query command.

3. The method of claim 1, further comprising:
   generating a query command in response to receiving the query input, wherein:
   the query command comprises one or more query constraints; and
   one or more of the query constraints is based at least in part on the determined search bias of the first user.

4. The method of claim 1, wherein the implicit bias is determined based on the analysis of user-profile information of the plurality of second users sharing one or more user attributes with the first user by:
   identifying at least one candidate user of the plurality of second users;
   comparing at least one first user attribute to at least one second user attribute of the at least one candidate user; and
   including, in the plurality of second users, the at least one candidate user when the at least one first user attribute matches the at least one second user attribute.

5. The method of claim 4, wherein the at least one first user attribute comprises at least one first data field,
   the at least one second user attribute of the at least one candidate user comprises at least one second data field, and
   the at least one first user attribute matches the at least one second user attribute when the at least one first data field matches the at least one second data field.

6. The method of claim 4, wherein the at least one first user attribute comprises at least one first user-bias connected to the first user by at least one first user-bias connection,
   the at least one second user attribute of the at least one candidate user comprises at least one second user-bias connected to the at least one candidate user by at least one second user-bias connection, and
   the at least one first user attribute matches the at least one second user attribute when the at least one first user-bias matches the at least one second user-bias, and the at least one first user-bias connection matches the at least one second user-bias connection.

7. The method of claim 4, wherein identifying one or more users of the plurality of second users comprises:
   identifying at least one biased content object that is connected to at least one of the plurality of second users by one or more connections; and
   including the at least one biased content object in the one or more users of the plurality of second users when the at least one biased content object satisfies the query.

8. The method of claim 4, wherein the implicit bias of the first user comprises a field-based user bias that includes at least one biasing user and at least one biasing-connection, and wherein determining the implicit bias based on the analysis of user-profile information of a plurality of second users sharing one or more user attributes with the first user further comprises:
   when the at least one first user attribute matches the at least one second user attribute:
   identifying the at least one biasing user based on the at least one candidate user for which the at least one first user attribute matches the at least one second user attribute, and
   identifying the at least one biasing-connection type based on at least one connection that connects the at least one candidate user to at least one biased content object.

9. The method of claim 8, wherein the at least one biasing user includes a copy of or a reference to the at least one candidate user for which the at least one first user attribute matches the at least one second user attribute.

10. The method of claim 8, wherein identifying the one or more users of the plurality of second users comprises:
    identifying at least one user from the plurality of second users, wherein the at least one user matches the at least one bias of the implicit bias of the first user and is connected to at least one biased content object by at least one connection of the at least one biasing-connection type; and
    including the at least one biased content object in the one or more users of the plurality of second users when the at least one biased content object satisfies the query.

11. The method of claim 4, wherein the implicit bias of the first user comprises an object-based user bias that includes at least one biasing user attribute of a biasing user, and at least one biasing-connection type, and wherein determining the implicit bias based on the analysis of user-profile information of a plurality of second users sharing one or more user attributes with the first user further comprises:
    when the at least one first user attribute matches the at least one second user attribute:

identifying the at least one biasing user attribute based on the first user attribute that matches the at least one second user attribute, and identifying the at least one biasing-connection type based on at least one connection that connects the at least one candidate user to at least one biased content object.

12. The method of claim 11, wherein identifying the one or more users of the plurality of second users comprises:

identifying at least one user from the plurality of second users, wherein the at least one user is associated with the at least one biasing user attribute and is connected to at least one biased content object by at least one connection of the at least one biasing-connection type; and including the at least one biased content object in the one or more users of the plurality of second users when the at least one biased content object satisfies the query.

13. The method of claim 12, wherein determining the implicit bias based on the analysis of user-profile information of a plurality of second users sharing one or more user attributes with the first user further comprises:

including, in the biasing user, one or more biasing data fields from the candidate user that represent the at least one first user attribute.

14. The method of claim 13, wherein the one or more users are associated with the at least one biasing user attribute when one or more user data fields included in the one or more users match the one or more biasing data fields included in the biasing user.

15. The method of claim 12, wherein determining the implicit bias based on the analysis of user-profile information of a plurality of second users sharing one or more user attributes with the first user further comprises:

connecting, to the biasing user, at least one user-bias that represents the at least one first user attribute, via at least one user-bias connection based on a user-bias connection type based on a type of at least one connection that connects the candidate user to a user-bias, wherein the one or more users are associated with the at least one biasing user attribute when the one or more users are connected to the at least one user-bias via at least one connection of the user-bias connection type.

16. The method of claim 4, wherein the plurality of candidate users comprise the plurality of second users.

17. The method of claim 4, wherein the plurality of candidate users comprise one or more users that are reachable from the first user via one or more user-bias connected by one or more user-bias connections.

18. The method of claim 1, wherein the user attributes include user age, sex, gender, ethnicity, religion, current location, town lived in, home town, likes, friends, school attended, game played, music listened to, video watched, organization worked at, or a combination thereof.

19. The method of claim 1, wherein determining the implicit bias based on the analysis of user-profile information of a plurality of second users sharing one or more user attributes with the first user further comprises:

calculating a score for each of the identified users, wherein the score is calculated using a probabilistic ranking model that scores each identified user based at least in part on a number of connections connecting the identified user to one or more users within the first set of users, the first set of users comprising the first user and a plurality of second users, respectively, sharing one or more user attributes with the first user.

20. The method of claim 1, wherein the plurality of second users correspond to a sub-population of an overall population of users associated with the online social network.

21. The method of claim 1, further comprising rewriting the query to include conditions based on the determined search bias of the first user.

22. The method of claim 1, further comprising updating the determined search bias of the first user if one or more of the plurality of second users are removed from the online social network.

23. The method of claim 1, wherein determining the search bias of the first user is further based on a structure of the shared one or more user attributes.

24. The method of claim 1, wherein identifying the one or more content objects further comprises scoring the one or more content objects based on one or more scoring algorithms, wherein the one or more scoring algorithms are customized based on the determined search bias of the first user.

25. The method of claim 1, wherein determining the search bias of the first user is further based on a search history of the first user.

26. One or more computer-readable non-transitory storage media embodying software that is operable when executed to:

receive, at the one or more computing systems from a client system associated with a first user of the online social network, a query input comprising a character string;

parse, by the one or more computing systems, the query input to identify one or more n-grams;

determine, by the one or more computing systems, a search bias of the first user with respect to the query input, the search bias being determined based on an explicit bias and an implicit bias of the first user, wherein the explicit bias is based on an analysis of the entities associated with the online social networking matching n-grams in the query input, and wherein the implicit bias is based on an analysis of user-profile information of a plurality of second users sharing one or more user attributes with the first user;

identify, by the one or more computing systems, one or more content objects matching the query input, wherein the one or more content objects are identified based at least in part on the search bias of the first user; and send, from by the one or more computing systems to the client system, responsive to the query input, instructions for presenting a search-results interface, wherein the search-results interface comprises references to one or more of the identified content objects.

27. A system comprising: one or more processors; and a memory coupled to the processors comprising instructions executable by the processors, the processors operable when executing the instructions to:

receive, at the one or more computing systems from a client system associated with a first user of the online social network, a query input comprising a character string;

parse, by the one or more computing systems, the query input to identify one or more n-grams;

determine, by the one or more computing systems, a search bias of the first user with respect to the query input, the search bias being determined based on an explicit bias and an implicit bias of the first user, wherein the explicit bias is based on an analysis of the entities associated with the online social networking matching n-grams in the query input, and wherein the implicit bias is based on an analysis of user-profile information of a plurality of second users sharing one or more user attributes with the first user;

identify, by the one or more computing systems, one or more content objects matching the query input, wherein the one or more content objects are identified based at least in part on the search bias of the first user; and send, from by the one or more computing systems to the client system, responsive to the query input, instructions for presenting a search-results interface, wherein the search-results interface comprises references to one or more of the identified content objects.

* * * * *